Oct. 1, 1935.　　　　F. L. FULLER　　　　2,015,749
CASH REGISTER
Original Filed April 1, 1926　　12 Sheets-Sheet 4

Inventor
Frederick L. Fuller
By
Carl Benst
His Attorney

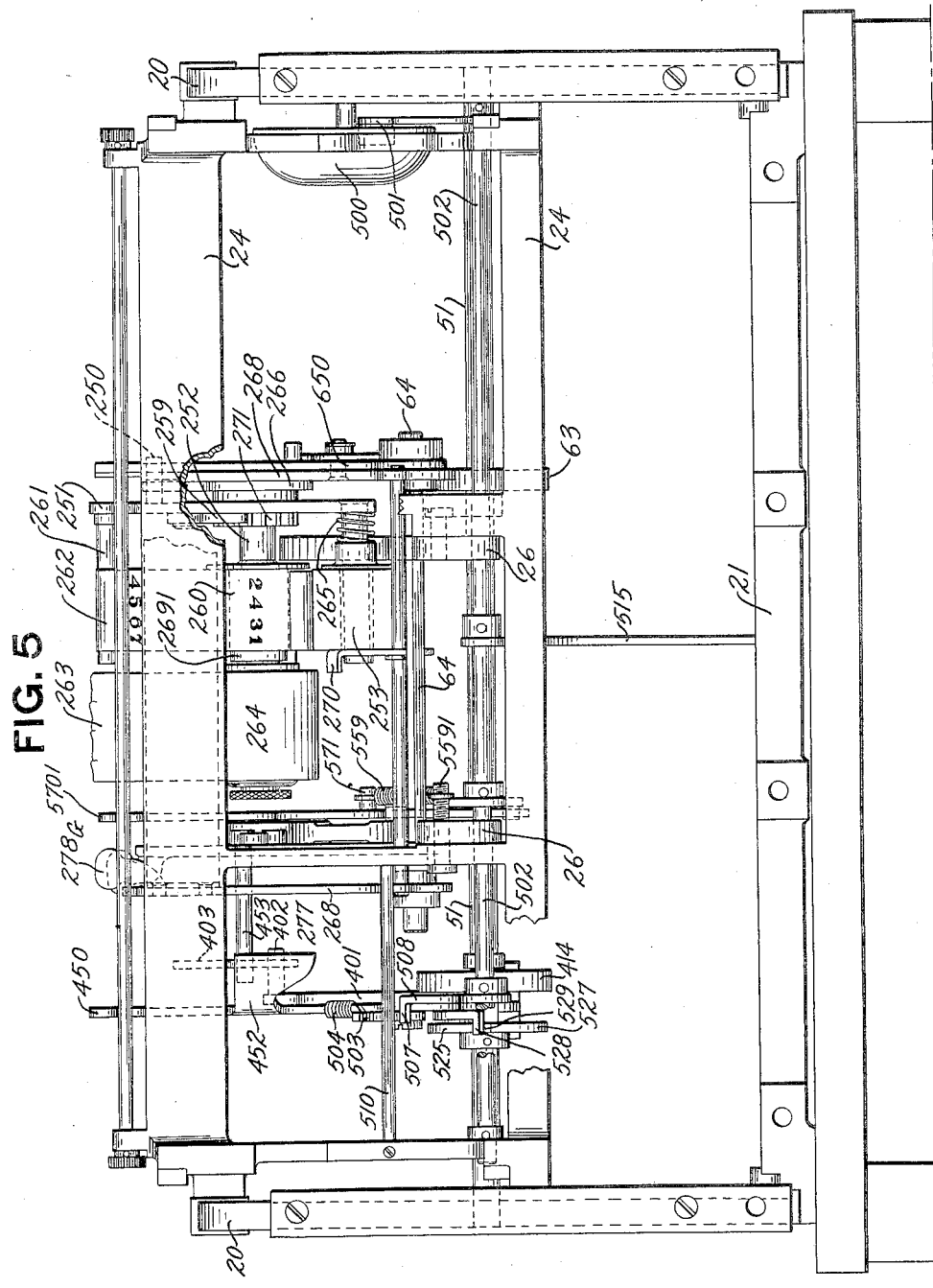

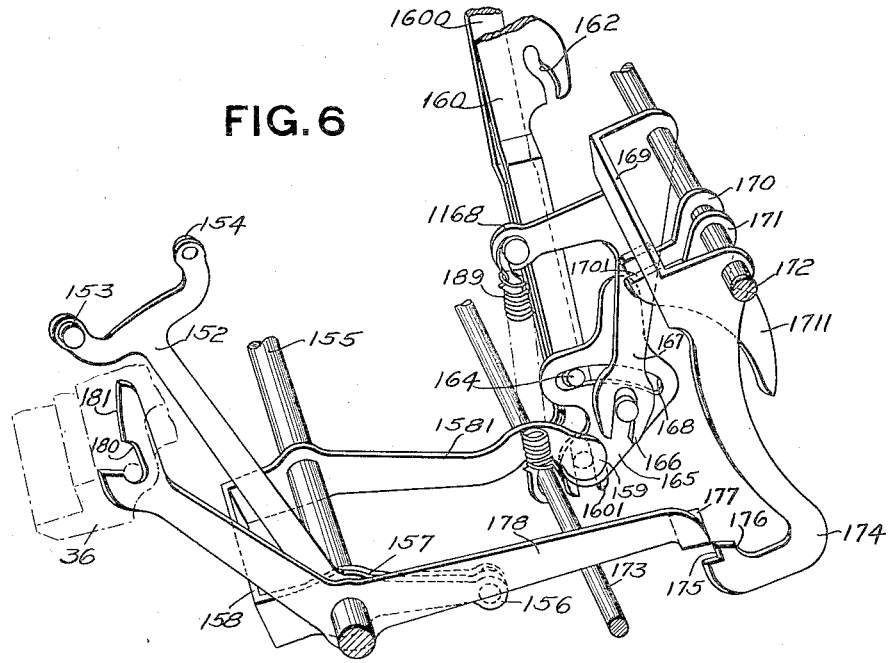

Oct. 1, 1935.   F. L. FULLER   2,015,749
CASH REGISTER
Original Filed April 1, 1926   12 Sheets-Sheet 7
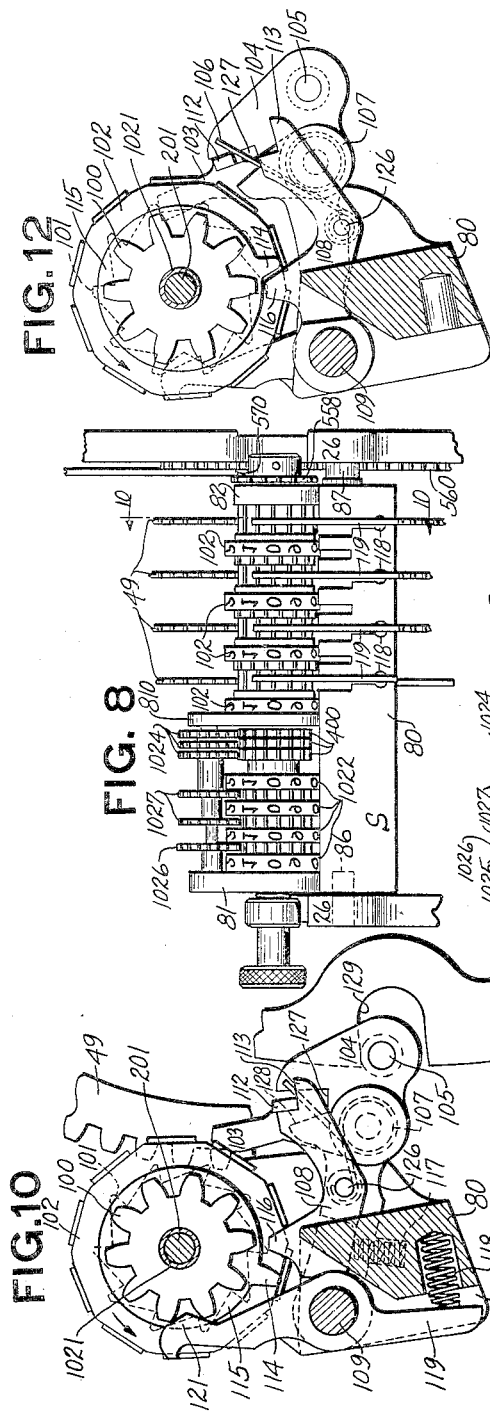
Inventor
Frederick L. Fuller
By
Carl Beust
His Attorney

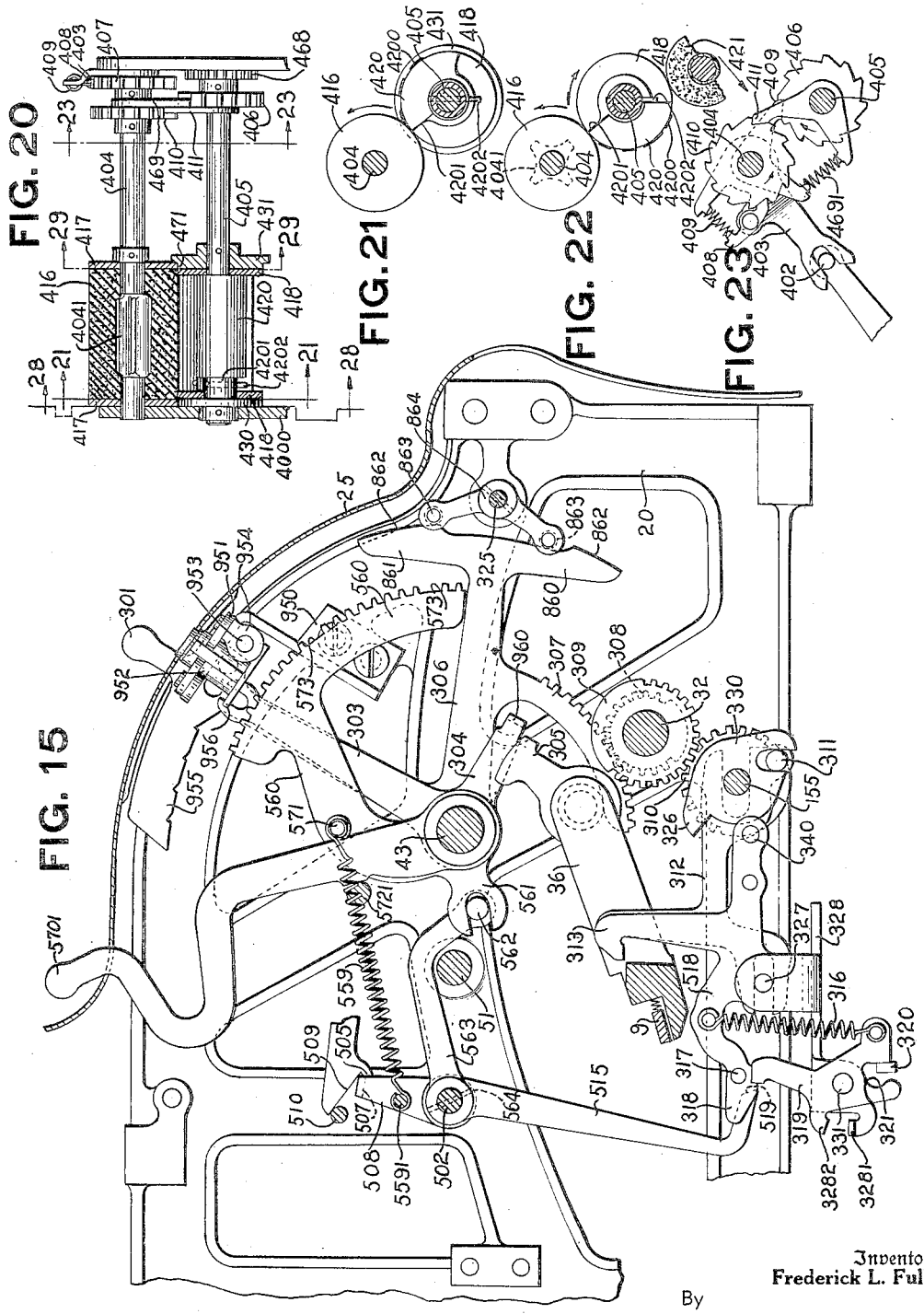

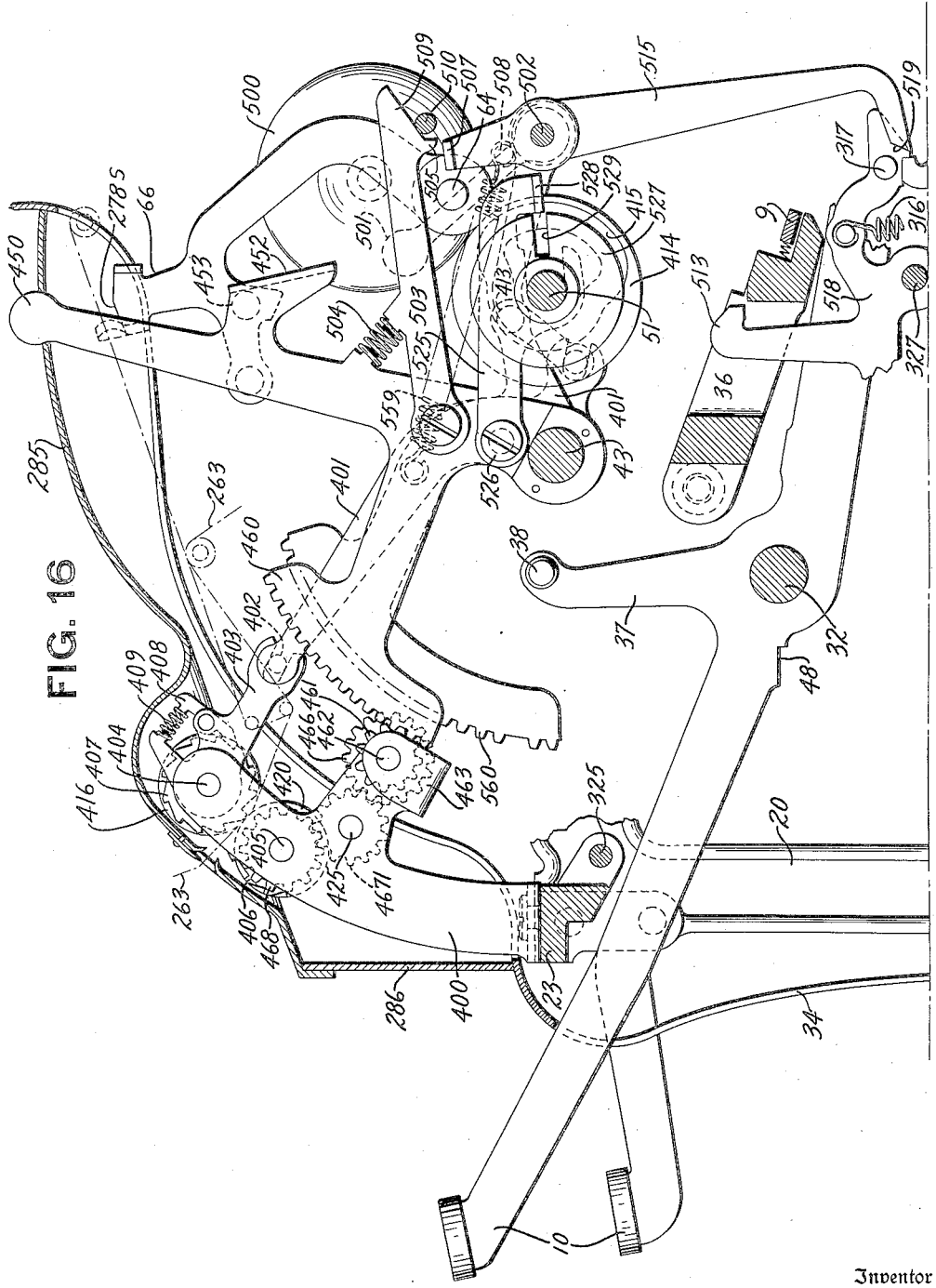

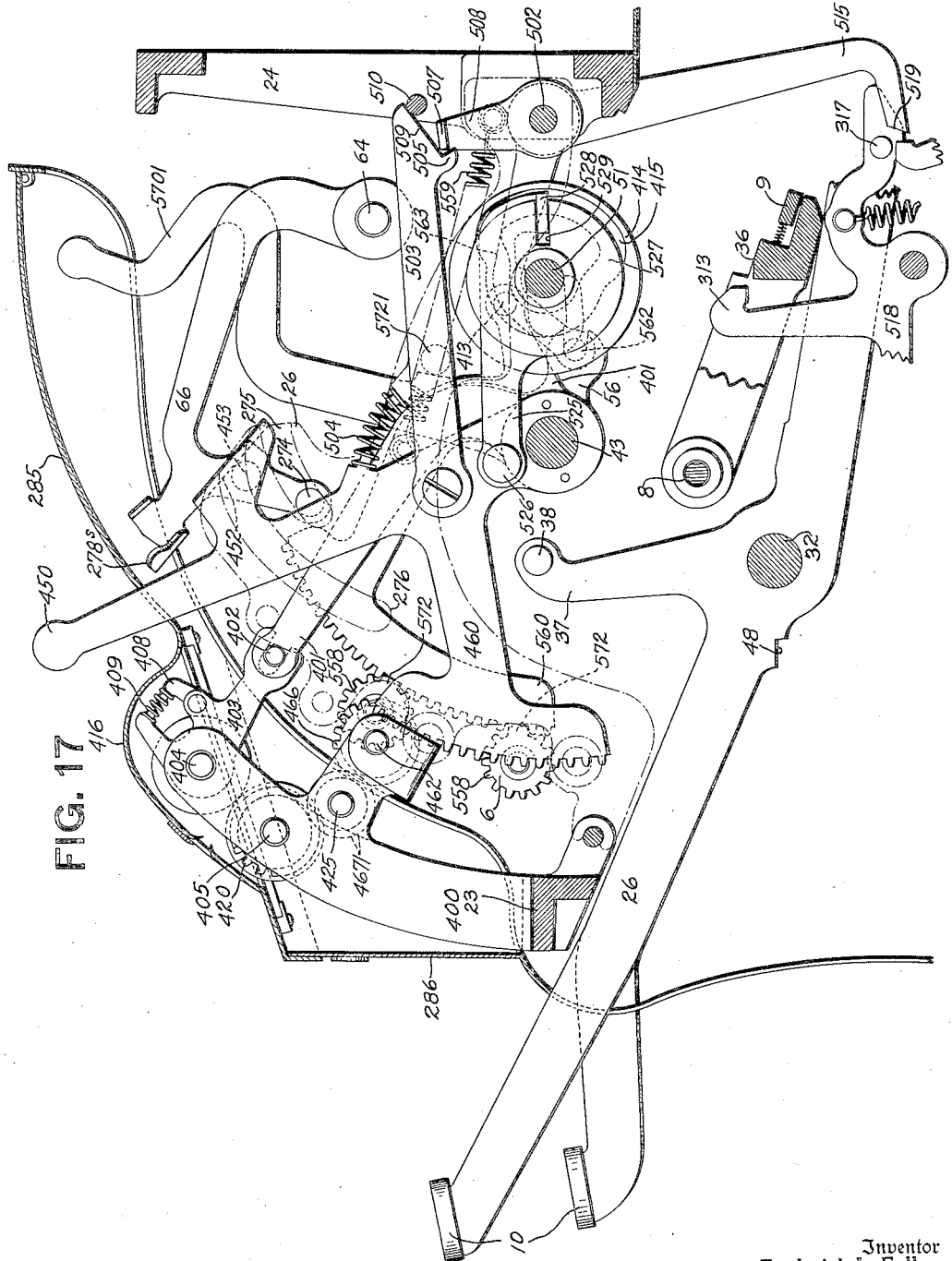

Oct. 1, 1935.  F. L. FULLER  2,015,749
CASH REGISTER
Original Filed April 1, 1926  12 Sheets-Sheet 11
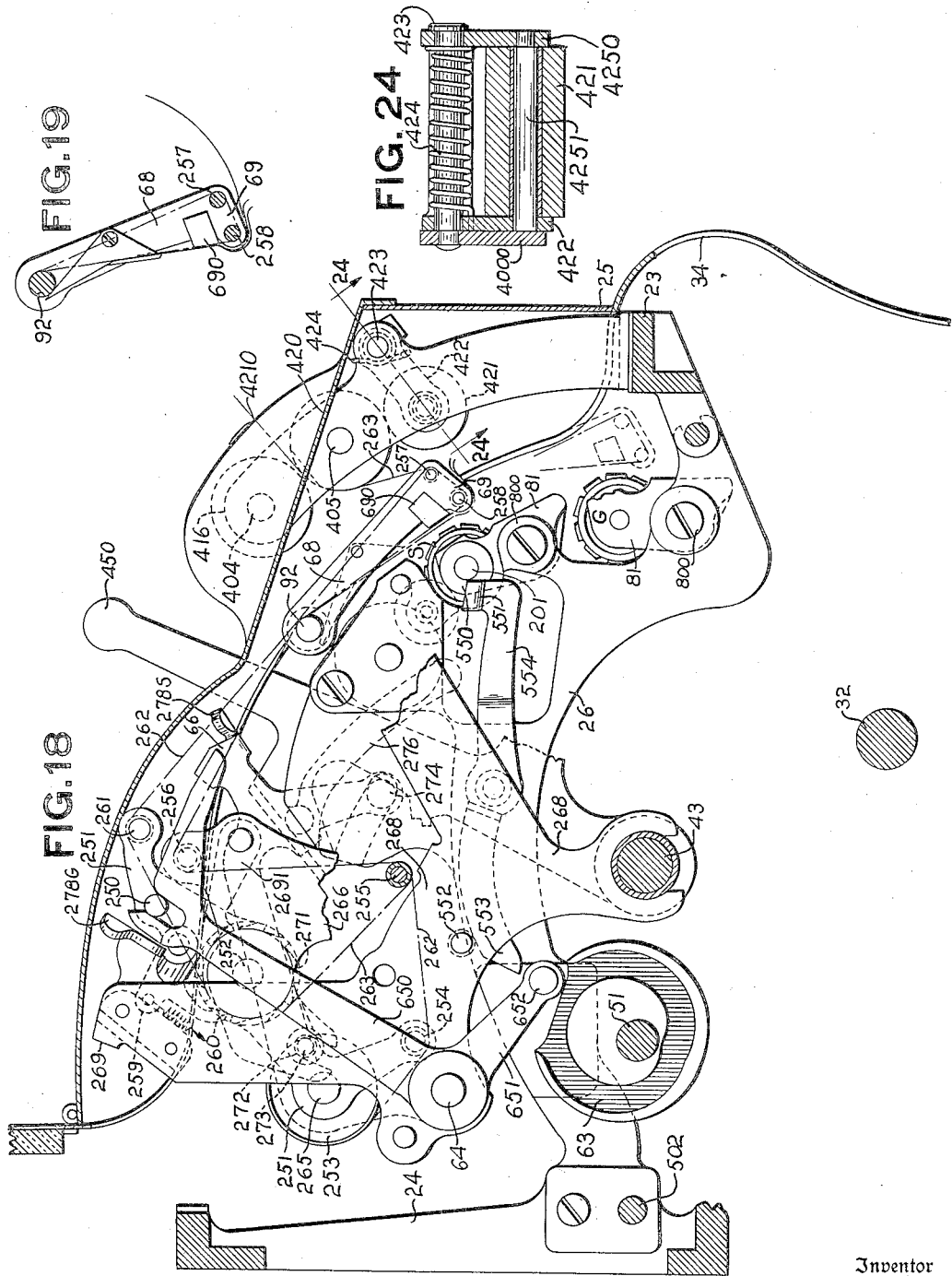
Inventor
Frederick L. Fuller
By
Carl Beust
His Attorney Oct. 1, 1935.  F. L. FULLER  2,015,749
CASH REGISTER
Original Filed April 1, 1926  12 Sheets-Sheet 12
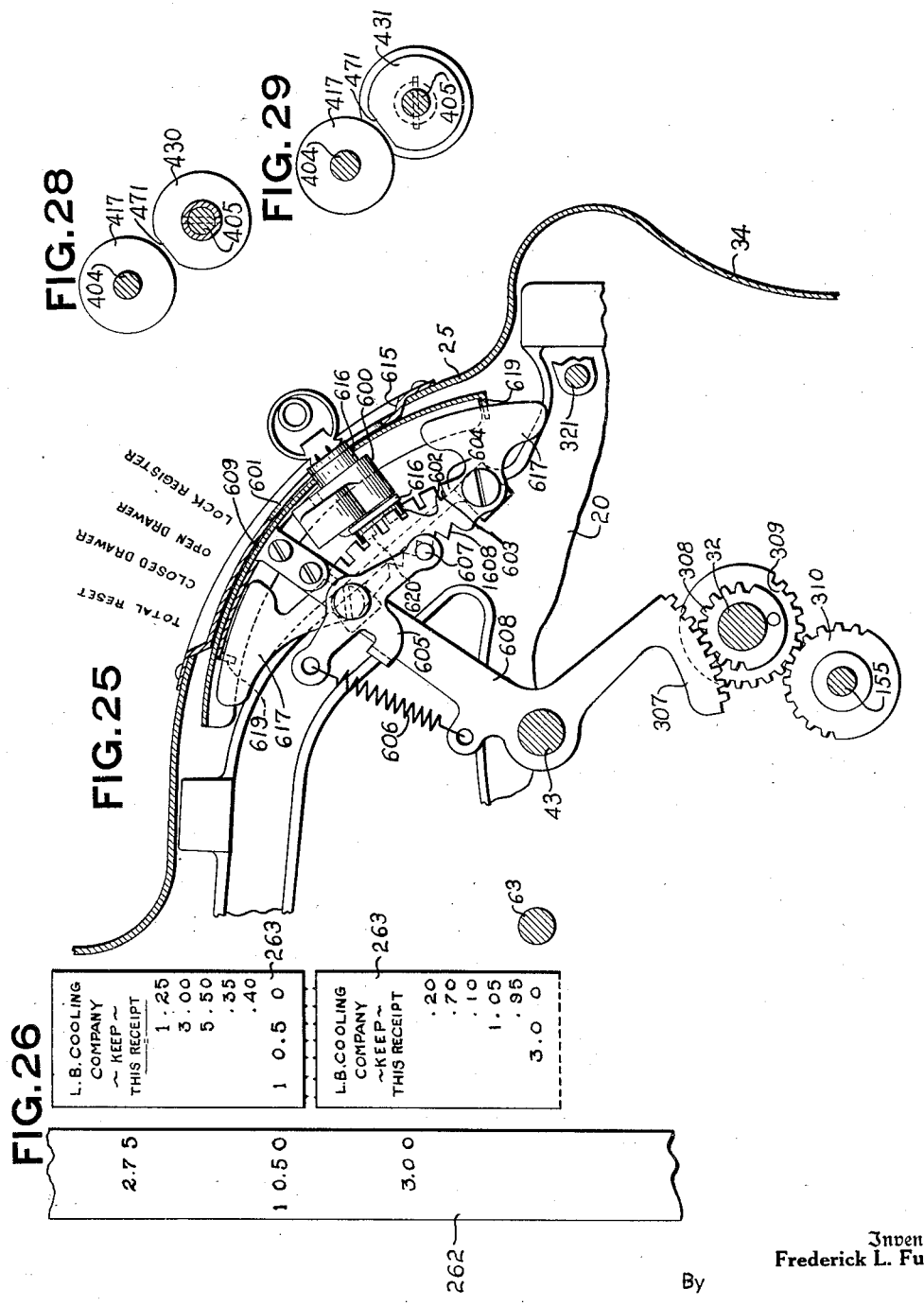
Inventor
Frederick L. Fuller
By
Carl Benst
His Attorney Patented Oct. 1, 1935

2,015,749

UNITED STATES PATENT OFFICE 2,015,749

CASH REGISTER

Frederick L. Fuller, West Orange, N. J., assignor to The National Cash Register Company, Dayton, Ohio, a corporation of Maryland Original application April 1, 1926, Serial No. 99,019. Divided and this application February 5, 1932, Serial No. 591,142

13 Claims. (Cl. 235—3)

This invention relates to cash registers or accounting machines and more particularly to that class of machines employing a plurality of accumulators.

The present case is a division of my application for Letters Patent, Serial No. 99,019, filed April 1, 1926, entitled "Cash registers".

One object of the present invention is the provision of suitable mechanism to insure the proper zero setting of the totalizers provided in the machine, and to insure the performance of this function in proper relation to the other functions performed by the machine.

With this and incidental objects in view the invention consists in certain novel features of construction and combination of parts, the essential elements of which are set forth in the appended claims, and a preferred form of embodiment of which is hereinafter described with reference to the drawings which accompany and form part of the specification.

Figure 4:
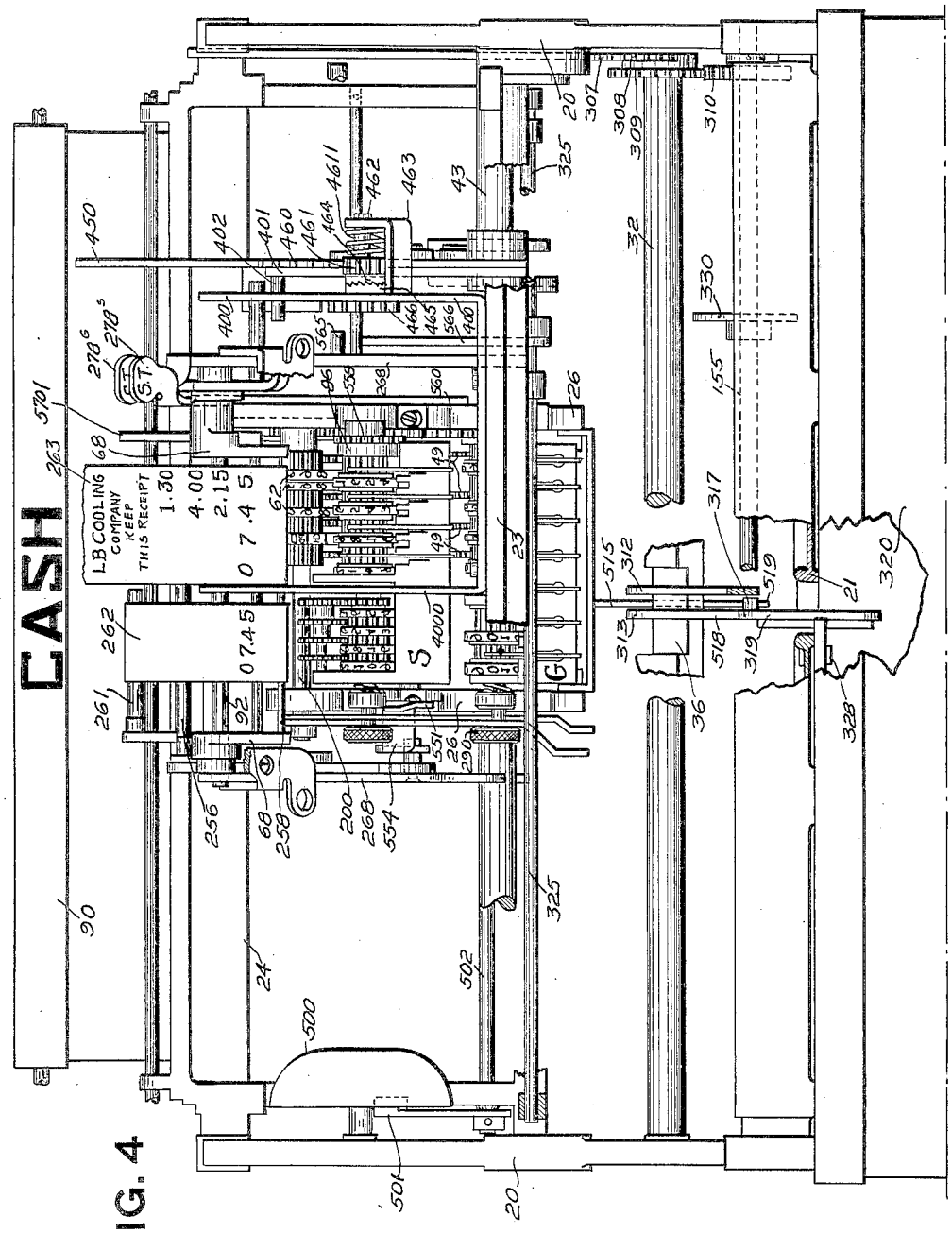

Fig. 4 is a view in front elevation of the machine, the cabinet being removed to show more clearly the parts. This figure shows clearly the two totalizers, the operating means for recording the totals of either accumulator, an itemized receipt, part of the printed record strip, and part of the clutch mechanism for rotating the roller so that the electro may imprint upon the issued itemized receipt.

Fig. 5 is a view in elevation of the rear of the machine showing the printer frame, the various supply and storage rolls carried thereby and the interlock between the item entering mechanism and the total recording device.

Fig. 6 is a view in perspective of the totalizer engaging mechanism.

Fig. 7 is a view in side elevation of the parts of the mechanism illustrated in Fig. 6, but showing the machine actuated to throw both totalizers into mesh. This view also illustrates the totalizer throwout mechanism.

Fig. 8 is a view in side elevation of the totalizer provided for accumulating the totals of a series of items showing the auxiliary accumulating elements which operate in unison with the accumulator elements and which are provided for recording the total of the series of items upon the record strip contained within the machine.

Fig. 9 is a longitudinal sectional view of the totalizer illustrated in Fig. 8 and shows the totalizer resetting shaft and resetting pinion.

Fig. 10 is a cross sectional view taken on the line 10—10 of Fig. 8 showing the component parts of the transfer mechanism.

Figs. 11 and 12 are views similar to Fig. 10 illustrating the parts in the different positions they assume while a transfer is being effected.

Fig. 13 is a detached detail plan view of part of the transfer mechanism and associated totalizer accumulating element.

Fig. 14 illustrates one of the transfer operating arms and shows the spirally arranged cams on the rotation shaft for oscillating the said arms.

Fig. 15 is a transverse sectional view showing the centralized lock control, the drawer release mechanism, and the resetting segment and the manipulative device for operating it.

Fig. 16 is a transverse sectional view of the machine showing the resetting segment, the manipulative means for recording a total of one of the totalizers, the driving mechanism for the itemized receipt feed roller, the mechanism for sounding an alarm, and the interlock between the total recording means and item entering mechanism.

Fig. 17 is a view similar to Fig. 16 showing the the total recording device pulled forwardly to take a total from the sub-totalizer, and showing the resetting segment in mesh with the resetting pinion of the subtotalizer in a position to restore the sub-totalizer accumulating elements to zero. This view also shows how the total recording device locks the rotation shaft and item entering mechanism against operation when a sub-total is being taken.

Fig. 18 is a view showing in detail the printer frame, the item recording type carriers, the two totalizers and the platen as well as part of the itemized receipt feeding mechanism. This figure illustrates the printer frame moved forwardly over one of the totalizers to print the total standing thereon upon the itemized receipt.

Fig. 19 shows the method of inserting a piece of paper under the platen so that the grand total may be imprinted thereon.

Fig. 20 shows a detail plan view of the driving mechanism for feeding the itemized receipt paper an increment after printing the items as well as the driving means for rotating the roller so that the electro may imprint upon the itemized receipt when recording a total.

Fig. 21 is a sectional view taken on the line 21—21 of Fig. 20 showing the position of the electro after it has imprinted upon the itemized receipt.

Fig. 22 is a view similar to Fig. 21 illustrating the electro in a position ready to imprint upon the issued receipt.

Fig. 23 is a sectional view taken on the line 23—23 of Fig. 20 showing part of the paper driving means and retaining pawls.

Fig. 24 is a sectional view taken on the line 24—24 of Fig. 18 showing the means for inking the electro.

Fig. 25 is a modification of the mechanism used for locking the centralized control lever in its various adjusted positions.

Fig. 26 illustrates part of the printed record strip and several samples of the issued itemized receipts the machine is capable of printing and issuing.

Fig. 27 (sheet 3) is a detached plan view of the four transaction keys and the special key known as the coupler lifting key.

Figs. 28 and 29 are views in side elevation taken along the lines 28—28 and 29—29 respectively in Fig. 20.

*General description*

Described in general terms the machine comprises a series of manipulative devices such as groups of keys which form the operating mechanism for entering the items on the itemized receipt and the totalizers. These keys are arranged upon a rod and each group operates upon cam plates secured to a differentially movable frame to which is secured a segmental rack. The differential movement of the segmental rack imparted by the keys is imparted to the elements of the totalizers as well as the item recording type. In this manner the type carriers are adjusted to a position corresponding to the value of the key depressed.

Totalizer engaging mechanism is provided for the machine, both totalizers being thrown into mesh with the actuating racks when a special key known as the "Coupler lifting" key is depressed a slight amount. Raising of the key coupler by depression of the special key allows other keys to be latched thereto and permits the operation of the machine by depression of a single key which has been latched to the coupler.

Two totalizers are provided, one which accumulates the total of a series of items, known in the art as a "sub-totalizer", while another totalizer is provided for the total accumulations of all the items additively entered in the machine. This totalizer is designated as the "grand totalizer." When certain of the keys which are known as transaction keys are depressed the totalizer throwout is actuated so that the "grand totalizer" is thrown out of cooperative relation with the actuating racks. The keys which actuate the totalizer throwout are the "Paid out" and "Charge" keys which transactions do not involve the receipt of cash although accompanied by the depression of amount keys. The remaining key which usually involves the receipt of money is the "Received on account" key which has no control over the totalizer throwout mechanism, both totalizers being thrown into cooperative relation with the actuating racks. The sub-totalizer is engaged with the actuating racks every time the machine is operated irrespective of the nature of the transaction or sale.

As the items are entered the type carriers will print the amount of each item upon the itemized receipt, the same being fed forward out of the machine an increment during each operation. The printing of items upon the receipt is preceded by an imprint of an electro bearing suitable words in the nature of an advertisement, etc.

When it is desired to take a total a suitable manipulative device is actuated whereby the printer frame will be rocked forwardly until the platen overlies the sub-totalizer accumulating elements where it is actuated to print the total upon the receipt. Restoring movement of the printer frame resets the accumulating elements to zero as an incident to accumulating a subsequent series of items. Simultaneously with the printing of the sub-total upon the itemized receipt the subtotal is also printed upon a record slip from a set of printing elements which operate in unison with the sub-totalizer accumulating elements. The last printed sub-total on the record strip is visible to the operator. Operation of the manipulative device for taking a sub-total releases the cash drawer, rings a suitable alarm and actuates a lock for preventing operation of the keys while taking a sub-total.

At the end of a day's business or any other desired period the grand total of the items entered into the machine may be obtained by setting a centralized lock control lever to a certain position. This control lever releases certain lids, under one being a manipulative device for taking the grand total. Manipulation of this will rock the printing frame forwardly, in a manner similar to taking a sub-total, until the platen overlies the grand totalizer. When in this position the platen is actuated thereby printing the grand total upon a suitable inserted slip. A separate means is also provided for resetting the grand totalizer.

The centralized lock control lever is normally locked and can be adjusted to its various positions only by those who possess the key of this lock. This control lever controls the manner in which the machine may be operated such as, open drawer, closed drawer, etc.

The detailed description which is about to follow is divided under suitable headings reference to which will give a detailed description of the various features embodied in the present invention.

For the purpose of illustration this invention has been shown as applied to a type of machine the general principle of which is disclosed in the U. S. applications S. N. 263,125 filed November 19, 1918 and S. N. 283,720 filed March 20, 1919 by Frederick L. Fuller, and the British patents to Frederick L. Fuller Nos. 135,456; 140,263; 157,823; 157,824 and 157,825 for the same invention, but it is to be understood that this invention is not limited to this type of machine but may with equal facility be applied to other well known forms of accounting machines. The U. S. applications aforesaid have matured into Patents 1,742,701, January 7, 1930, and 1,729,338, September 24, 1929 respectively.

Supporting frames

The various parts of the mechanism are supported by a suitable framework comprising a base casting 21 (Fig. 2) and side frames 20 (Fig. 4) the latter being connected near their upper rear ends by a casting 24 (Figs. 2 and 5) utilized to support the tablet indicators and mechanism associated therewith. Further cross connections between the side frame 20 are in the form of a tie bar 23 across the lower front of the machine and a tie bar 22 across the lower rear part.

Near the center of the machine is a pair of supporting members 26 (Fig. 4) parallel to the side frames 20 serving to support the totalizers and the type carriers for printing upon the itemized receipt and the record strip. The mechanism is enclosed by a cabinet 25 of any suitable form and made of any desired material.

Keyboard

The illustrative machine is provided with 32 keys (Fig. 1) there being three groups of amount keys; one group for entering amounts from 1¢ to 9¢, one group for amounts ranging from 10¢ to 90¢ and the remaining group for entering denominations from $1.00 to $9.00 inclusive. Four transaction keys are provided for denoting the type of transaction entered into the machine having associated therewith suitable indicators for showing to the bystander the nature of the transaction. The remaining key situated to the extreme left of the keyboard comprises a key known as the "Coupler lifting key," the purpose and construction of which will be explained hereinafter.

Key coupler

Figure 2:
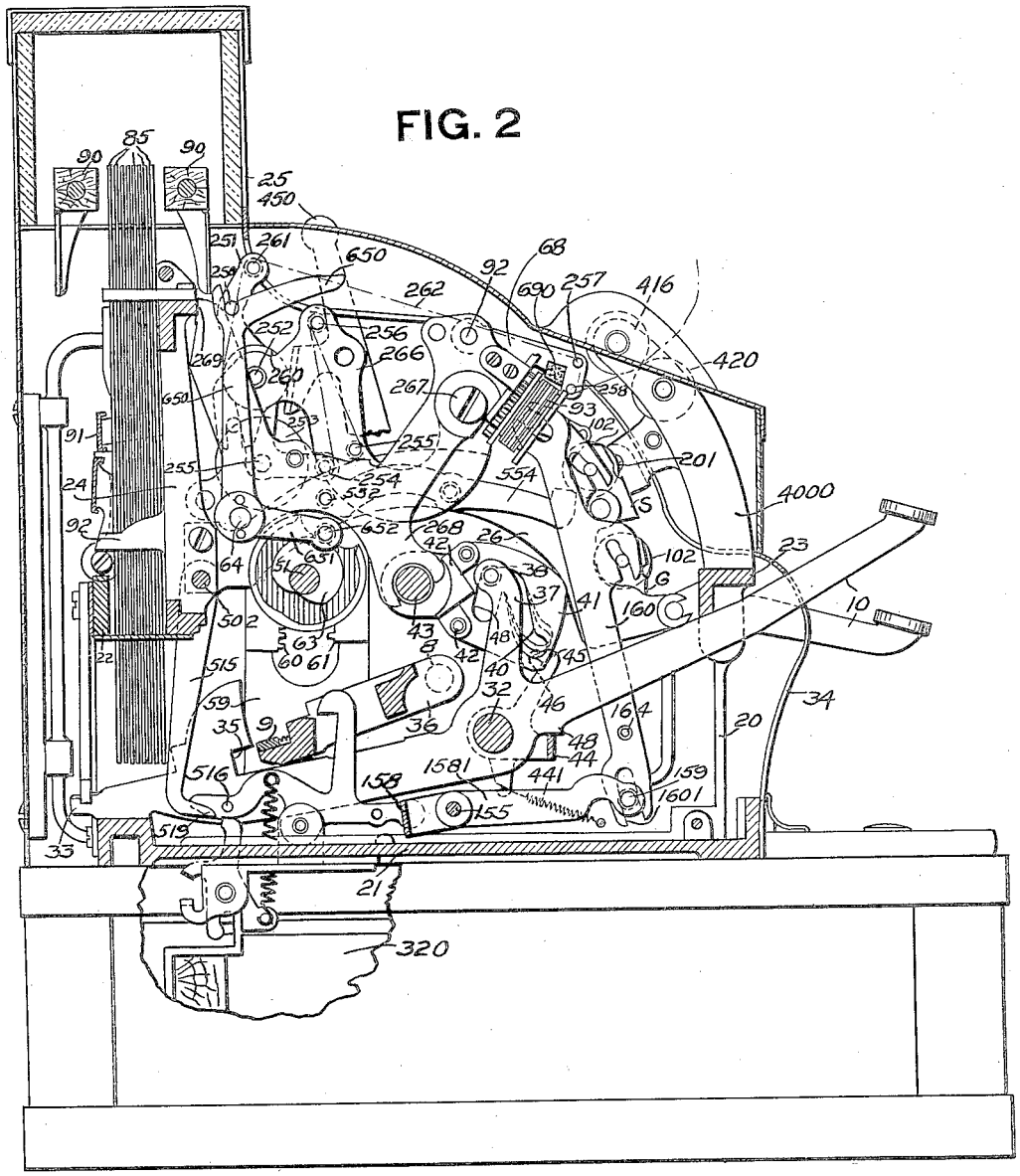
Fig. 2 is a transverse sectional view of the machine showing the item entering keys, the differential mechanism, the totalizer, the drawer release mechanism and the movable printer frame adapted to record the total standing upon either totalizer.

As is usual in a cash registering machine of the type used for illustration, there is provided a key coupler 36 best shown in Figs. 2, 3, 6, 7, pivotally mounted on a shaft 8 journaled between the side frames 20. Mounted upon the nose of the key coupler 36 is a series of spring pressed latch plates 9, a latch plate being provided for each group of keys. Reference to Fig. 2 shows that the pivotal points of the key coupler 36 and keys are displaced with respect to each other so that a circular arc described by the rear edge of the key coupler 36 will intersect an arc described with the key shaft as a center and passing thru the same point. Advantage is taken of these intersecting arcs for the purpose of latching or coupling the keys so the depression of any particular key will result in a depression of all the other keys that have been attached to the coupler. This mechanism is old and well known in the art and need not be described in detail.

Connected to the key coupler 36 is a plate 59 (Fig. 2) provided with rack teeth 60 and 61. Fast to a shaft 51 journalled between the side frames is a pinion (not shown) meshing alternately with the rack teeth 60, 61. The result of this is that when the coupler is rocked by the keys the rack teeth of the plate alternately engage the teeth of the pinion fast to the shaft 51 and by this means a complete reciprocation of the coupler effects a complete rotation of the shaft. The mechanism for effecting rotation of the shaft is also old and is not described in detail.

Coupler lifting key

The key 31 (see Fig. 3) which is preferably located at the extreme left of the keyboard, besides having certain other functions, has for its main purpose to serve as a means whereby the key coupler 36 may be partially raised to what may be termed the coupling position, in which position other keys representing the nature and amount of the transaction may be engaged with the coupler so that operation or movement of the entire set of keys so engaged with the coupler may be completed by pressure applied to any engaged amount or transaction key.

The coupler lifting key 31 (Fig. 3) is pivoted at substantially its mid-portion upon a transverse shaft 32 journalled in the side frames 20 and carries at its rear end a weight 57 serving to return the key to its normal or home position. The rear portion of the key is provided with a cam surface 52 and cooperating with a face 54 on a shoulder of the coupler 36. The surface 53 of the cut in the key provides a stop face which engages the front edge of the shoulder of the coupler and stops the motion of the key and the key coupler. From this it is evident that when the key 31 is depressed the cam edge 52 will cooperate with the shoulder to rock the coupler 36 to the position shown in Fig. 3 and in this position the surface 53 of the key will act against the shoulder of the coupler to arrest further movement of both the key and coupler. Any suitable full stroke mechanism, such as that shown in the Fuller application S. N. 263,125 and the British patents previously mentioned may be utilized to hold the key and the coupler in this partially elevated position. When the finger is removed the weight 57 will assist in allowing the rear end of the key to drop back toward its normal position until a finger 140 thereon rests upon a lug 58 formed on the shoulder of the coupler. At this time any of the other keys may be slightly depressed to engage them with the coupler, for further operation. During this further operation the lug 58 will be received by the cut-away portion 41 in the key, thereby causing the coupler to lift the rear end of the key and raise a special indicator 31' resting on the rear end of the key to the position shown in Fig. 1.

Transaction keys

Figure 1:
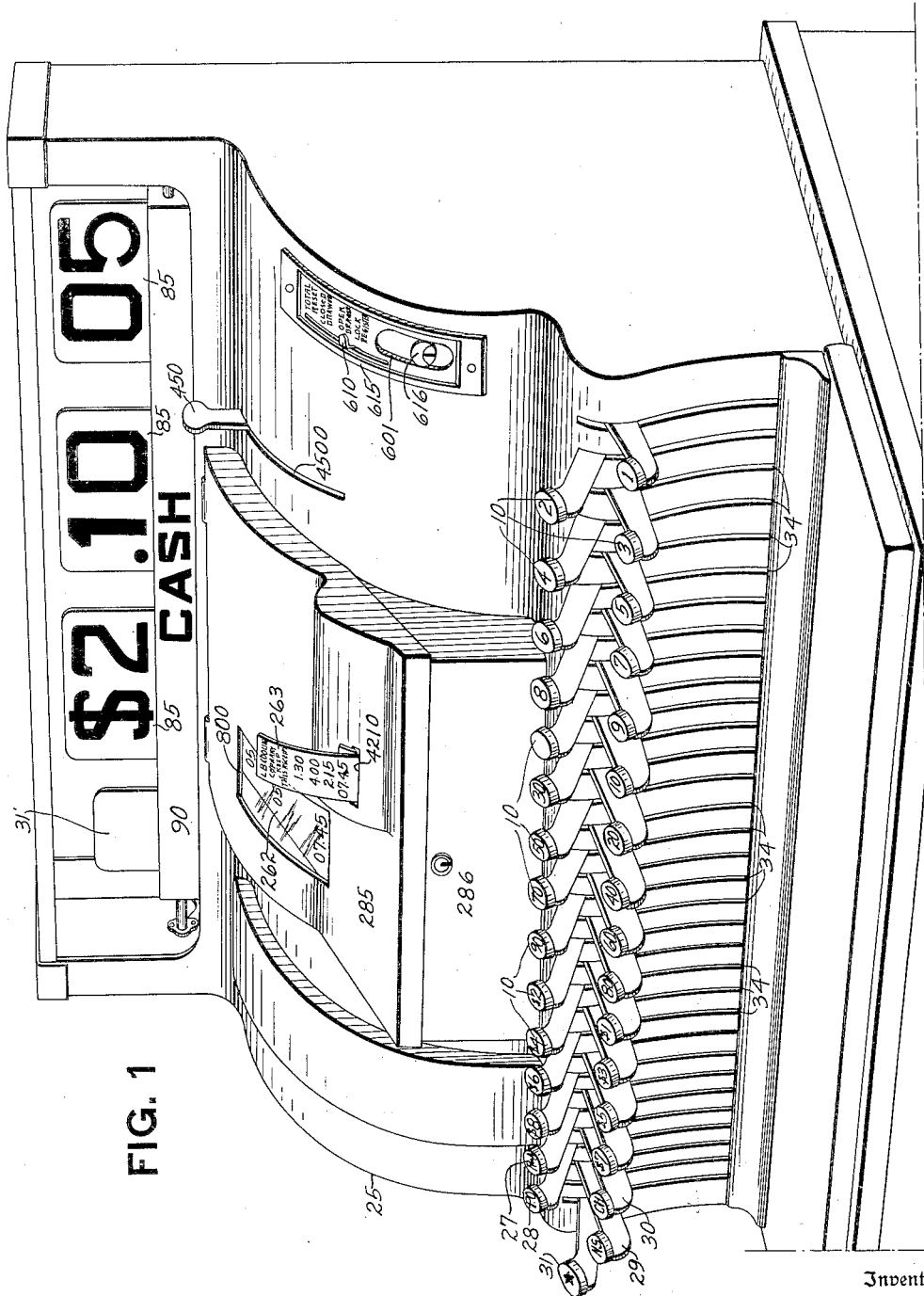
Fig. 1 is a view in perspective of the cash register to which this machine is applied showing the different banks of keys, the sub-total recording device, the tablet and bar indicators, the centralized lock control, a part of the record strip and a sample of an itemized receipt which has just been issued.

The transaction keys four in number, are designated by reference characters 27, 28, 29 and 30, and are clearly shown in Fig. 1 and Fig. 7 illustrating the "Paid out" and "Charge" keys 27, 28. The transaction keys are constructed substantially the same as the numeral keys 16 (Fig. 17) which will be described more in detail hereinafter. Each of said transaction keys are provided with suitable key caps bearing indicia to designate the type of transaction to be registered. Each transaction key is loosely mounted upon the key shaft 32, and the rearward extension thereof lies directly beneath the key coupler 36, so that when the key coupler has been raised and held in its coupling position as above described, one of the transaction keys may be partially depressed and latched thereto by means which has been briefly explained heretofore in this application and more fully described and illustrated in the copending application, Serial No. 283,720, filed March 20, 1919, by Frederick L. Fuller and the British patents previously cited to which reference may be had for further details.

It is desirable that an indication be made of the particular transaction key which has been operated and for this reason the machine is provided with a plurality of transaction indicators 90 (Fig. 2) of the bar type which extend transversely of the machine. A plurality of these indicators are provided so as to give a front and back indication and are further so constructed and located in respect to the tablet indicators which are appropriate to the amount keys so as to perform the function of a flash; i. e., to conceal the tablet indicators while they are being raised to their uppermost position. When the tablets which have been raised by the operated amount keys have been held in their elevated position, the transaction indicators are lowered and by mechanism appurtenant to the transaction keys are rotated and set an amount to exhibit indicia which indicates the nature of the transaction.

The indicator mechanism is briefly described here as it forms no part of the present invention and for further details of construction and operation reference may be had to the British patents previously mentioned.

Amount keys

The amount keys 10 which extend nearly across the front of the machine as clearly shown in Fig. 1, are loosely pivoted upon the key shaft 32 so that they may be moved through an angle about said shaft as a pivot. Referring to Fig. 2, it is seen that each of the amount keys 10 is guided in its movement by slots 34 formed in the cabinet and lies immediately below the key coupler. Each amount key is provided with a notch such as 35 engageable by the nose of the key coupler 36 when the keys are depressed, so that they may be latched to the key coupler When the key coupler 36 has been elevated a predetermined distance upon the depression of the coupler lifting key 31, the nose of the key coupler is elevated so that said nose is slightly above the notch of all undepressed keys. Mounted on the nose of the key coupler are suitable spring-pressed latch plates, as have been described heretofore, which spring rearwardly so as to permit said latch plate to slide into the notch 35 when an amount key has been partially depressed, so that a further movement of the key coupler by any engaged key will result in a complete depression of all partially depressed keys.

Each of the numeral keys is provided with an upwardly extending arm 37 carrying at its extreme upward end a suitable anti-friction roller 38 which cooperates with slots 40 formed in a cam plate 41 as will be more fully described hereinafter.

Amount indicators

Resting upon the rear ends of the amount keys are indicator stems clearly illustrated in Fig. 2, so that a complete depression of an amount key will elevate the corresponding indicator 85 to indicate to the operator and the public the amount of the transaction. Since the indicators 85 are arranged in denominational groups the indicator stems 88 are staggered so that said stems will lie immediately above the rear end of its corresponding amount key.

The means for retaining the indicators in their elevated position and for releasing them during a previous operation forms no part of the present invention and one form which this mechanism might take is shown in the Fuller application S. N. 263,125 and the British patents previously mentioned, to which reference may be had for a more detailed showing and description.

Differential mechanism

The differential mechanisms or devices controlled by each of the various banks of amount keys and transaction keys are all similar in construction and principle and the description of one will suffice for all.

Loosely mounted upon a shaft 43 journalled between the side frames 20 is a frame 42 (Fig. 2) provided with spaced slots in which are inserted and secured by any desirable means a series of cam plates 41 one for each key of a particular group. The cam plates 41 are provided with L shaped slots 40, having portions concentric with respect to shaft 43 and other portions extending away from the shaft, and graduated as clearly shown in Fig. 2. The anti-friction rollers 38 cooperate with the respective cam slots and from the foregoing it will be evident that upon a depression of an amount key a differential movement will be imparted to the frame 42. When the frame 42 is actuated differentially the rollers 38 of the undepressed amount keys remaining in the respective bank will play in the concentric portions of slots 40 provided to permit the upward tilting of the cam plates 41 without interfering with the rollers of the unoperated keys.

It is to be understood that there is a differential frame 42 for each group of amount keys and one for the transaction group of keys as well.

Figure 3:
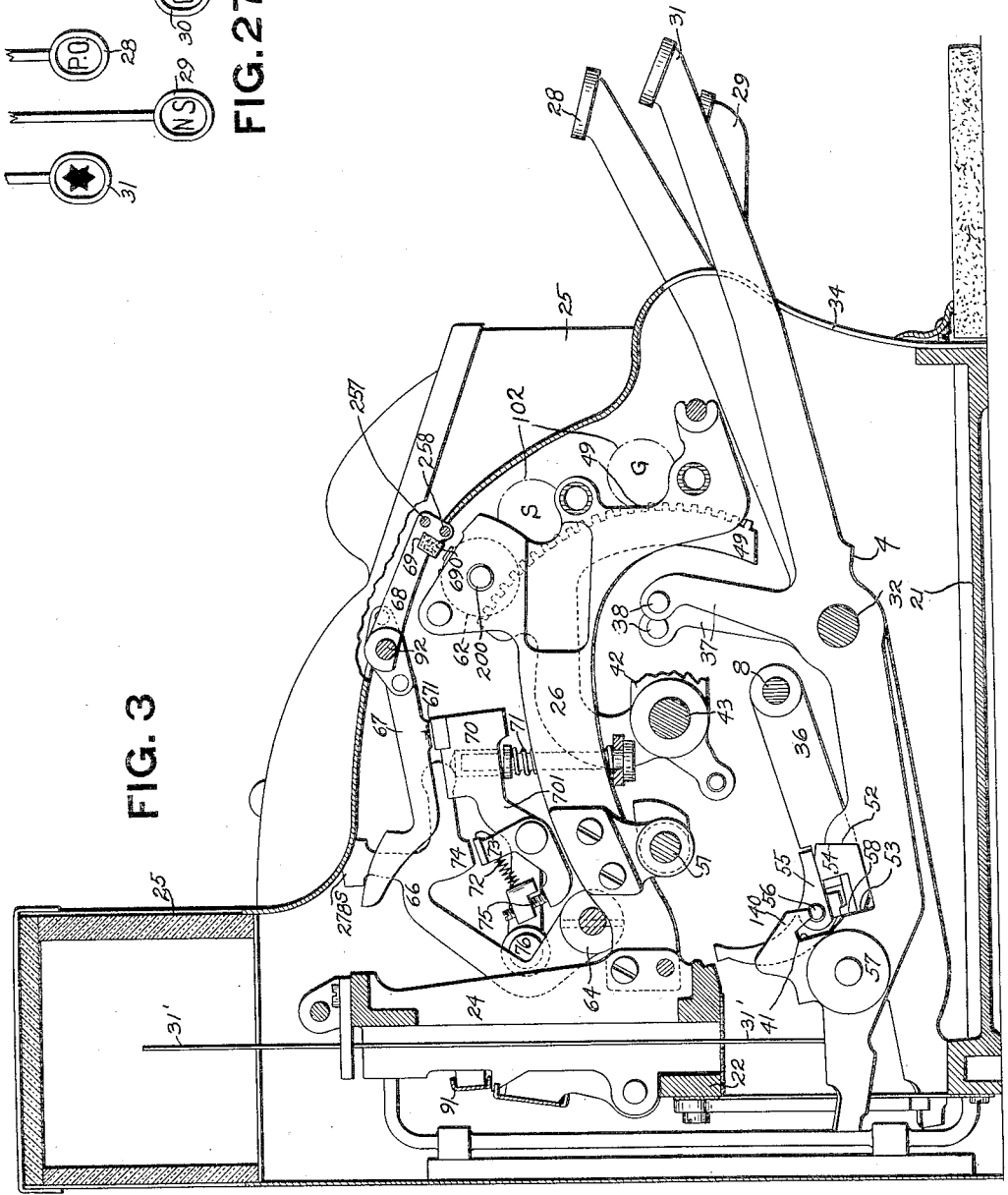
Fig. 3 is another transverse sectional view showing how the coupler lifting key is depressed a small amount to lift and hold the coupler in a position whereby other keys may be latched thereto. This view also shows the platen and the platen actuating means.

Each differential frame 42 has secured or connected to it so as to be movable therewith a segmental rack 49 (Figs. 3 and 4). Since there are four differential frames there is a similar number of segmental racks, the four racks 49 being shown in Fig. 4.

Referring to this figure it will be seen that the totalizer actuating racks 49 are spaced closely together, whereas, reference to Fig. 1 shows that the numeral keys are spaced across substantially the entire front of the machine. It is therefore necessary to provide suitable transposing mechanism for transmitting the motion from any of the differentially actuated frames to the closely spaced actuating racks shown in Fig. 4, and to this end any suitable bail mechanism for transferring this movement may be conveniently utilized for this purpose.

Means for locking the actuators in normal position

It is desirable that the segment frame and segments attached thereto be locked in normal position. To this end, one of the plates 41 of each group is provided with a locking projection 46 which is adapted to engage with the square face of an upwardly spring urged hook 45. The hook 45 is formed as an upwardly and rearwardly extending projection of a bail 44, which is common to all the numeral keys of a particular denominational group or order and there is also one provided for the group of transaction keys. Each of the numeral keys is provided with a projection 48 which lies over the upper edge of the bail 44, so that when a key of a group is depressed, the projection 48 will rock bail 44 downwardly against the action of its spring 441 and thus disengage the hook 45 from the locking projection 46, so that a particular key may now rock its corresponding plate 41. It is thus seen that a partial depression of a key is necessary before the associated frame 42 is free to be rocked differentially. Therefore, the plates 41 are formed with a concentric portion or dwell to allow the depressed key to unlock its corresponding segment frame without rocking its plate. This dwell corresponds in angular movement to that required for latching partially depressed keys to the key coupler. Thus when the coupler lifting key 31 has been depressed to a position designated as the coupling point, the coupler likewise is moved through an angular distance corresponding to the movement required by a numeral or transaction key to unlock its associated segment frame. Hence, all actuator locks are disabled when the keys are depressed to the coupling point.

Item printing wheels

A suitable set of printing wheels is provided for the purpose of positioning type for printing the amount and character of the transactions upon the itemized receipt. Referring to Figs. 3 and 4, there will be seen a plurality of the type wheels 62. Rigidly attached to each of the type wheels 62 is a pinion meshing with the associated actuating rack 49. All the item and transaction printing type wheels are loosely mounted upon a shaft 200 suitably journalled between the intermediate supporting frames 26. Thus it is evident that when the keys 10 are depressed and their corresponding racks 49 thereby given a differential degree of movement the printing wheels 62 will be rotated, correspondingly, so that when suitable impressions means are actuated, said wheels 62 will print characters indicating the amount and nature of the transaction.

Totalizers

In the machine disclosed in the accompanying drawings there are shown two totalizers designated generally by the letters S and G, the accumulating elements of which are driven by the actuators 49. Referring particularly to Figs. 2 and 4, the totalizer S is designed to accumulate the total of quantities to be printed on an issued itemized check. This totalizer may be termed a "sub-totalizer". The totalizer G is designed to accumulate a grand total of all items additively entered into the machine.

These totalizers are pivotally mounted between the side frames 26 just below the item type carriers 62 and comprise a plurality of totalizer elements 102 the peripheries of which are provided with suitable printing type so that the totals accumulated thereon may be printed upon an issued receipt or check from the S totalizer and upon an inserted slip of paper from the G totalizer in a manner to be more fully described hereinafter.

The totalizer elements are operable by the segmental racks 49 which set up the item type carriers and it is to be noted at this point that although the segmental rack corresponding to the transaction group of keys sets an item type carrier 62 it does not actuate the totalizer elements, the rack teeth being cut away to prevent this as shown in Fig. 8.

In the particular illustrative embodiment the totalizer "S" comprises four adding wheels 102 but this number may be altered to meet the requirements of a particular registering capicity.

The totalizer "G" comprises seven adding elements, but this number may also be altered at will to meet any special requirements.

The totalizers "S" and "G" are alike in principle and a description of one totalizer will suffice for all. The totalizer "S" is best illustrated in Figs. 8 and 9 of the drawings. A totalizer frame 80 formed with ears 81 and 82 supports a shaft 201. Each totalizer wheel 102 is rotatable around the shaft 201 and has attached to it a pinion 100, a transfer disc 115 carrying a tripping tooth 114 (Fig. 10) and, except the units wheel, a ratchet wheel 101, which is moved one tooth for effecting transfers. Below and parallel to shaft 201 just mentioned is a second shaft 109. This shaft carries the various devices for effecting transfers which will be explained more fully hereinafter. The frame 80 is further provided with bearings 86 and 87 (Fig. 8) which are adapted to receive studs passing thru the side frames 26 so that the totalizer may be oscillated bodily about the studs to move the totalizer wheels into or out of engagement with the actuating segments.

Transfer mechanism

The transfer mechanism employed is of the type known as independently actuated, successive and is operated upon the return stroke of the keys, at which time the totalizer pinions 100 are out of mesh with their respective actuators 49. The transfer mechanism is best shown in Figs. 8–14 inclusive.

As stated before each totalizer wheel 102 has attached to it at one side a transfer disc 115 carrying a trip tooth 114 which is in the line of travel of a trip tooth 116 and adapted to engage therewith as the totalizer wheel passes from its "9" to "0" position. The trip tooth 116 is formed as an upward extension of an arm 108, loosely mounted on the transverse shaft 109, the rear end of said arm being further provided with a shelf 113. Loosely pivoted upon the shaft 109 adjacent to the arm 108 is a transfer arm 104 which has pivoted at its rear end a pawl 103 which is provided with a bent over lug 112.

The transfer arm 104 is further provided with a stud 105 and a notch, the sides of which are designated by reference characters 127, 128 (Fig. 10). The upper engaging end of the transfer pawl 103 carried by the transfer arm 104 engages the ratchet wheel of the totalizer element of the next higher order and normally lies in close proximity to the said ratchet wheel. A spring 106 is coiled around a spool headed stud 107 secured to the arm 104, one end of the spring being connected to a stud 126 secured to the arm 108 while the other end bears against the lug 112. Normally the spring 106 forces the lug 112 on the trip pawl 103 against the shelf 113 as shown in Fig. 10. Normally the lug 112 is substantially mid-way between the sides of a notch 128 formed in the rear end of the transfer arm 104 and allowing the transfer pawl 103 to move forwardly at the desired time until the lug 112 contacts with the forward edge.

Each transfer arm 104 which carries a transfer pawl 103 is provided with a stud 105 which cooperates with a slot 129 formed in the forward end of a transfer operating arm 110 as best seen in Fig. 14.

The transfer operating arms 110 are loosely mounted upon the shaft 43 and are provided with rearward extensions 121 carrying oppositely projecting rollers 122 and 123. Upon the rotation shaft 51 which, as stated before, is given a complete rotation upon each operation of the machine, is secured a series of complementary cams 124 and 125 the peripheries of which are in contact with their associated anti-friction rollers. The pairs of cams are spirally arranged about the shaft 51 so that in a cycle of rotation about the shaft 51 the cams will actuate the transfer arms successively, first the tens transfer arm then the hundreds, etc.

The sequence of operation is illustrated in Figs. 10, 11 and 12 and from the foregoing it will be evident that each time the disc 115 makes a complete revolution rotating in the direction of the arrow shown in Fig. 10 of the drawings, the trip tooth 114 will contact with the projection 116 and force the arm 108 downwardly against the tension of the spring 106. The result of this movement is that the vertical edge of the shelf 113 will ride along the lug 112 until the said lug clears the shelf 113, whereupon the spring 106 will force the pawl 103 forward sufficiently to bring the upper engaging end of the pawl in line with the ratchet wheel 101. The position of the parts is now as shown in Fig. 11 and by referring to this figure it will be seen that the rearward edge of the notch 128 formed in the arm 104 has limited the forward movement of the pawl 103.

During the upstroke of the keys the totalizers will be thrown out of mesh and the arm 110 will be oscillated by its respective cam with the result that the transfer arm 104 is rocked upwardly. As the pawl 103 which is carried thereby begins its upward movement it meshes with a tooth on the corresponding ratchet wheel 101 of the next higher order and advances the same to effect the necessary transfer. Due to the fact that the transfer arm 104 and the arm 108 are inter-connected by spring 106 the arm 108 will also be raised upwardly until it is arrested by the projection 116 contacting with the periphery of the disc 115 as clearly shown in Fig. 12. This is an effective means of preventing over-rotation of the ratchet wheel when transfers are to be made.

When the arm 104 and pawl 103 begin their downward movement the pawl 103 will move in a substantial vertical direction over the interfering tooth of the ratchet wheel 101 and upon further downward movement of the transfer arm 110 the lug 112 will move downwardly upon the shelf 113 until it is again in the position shown in Fig. 10. It is to be noted that when the pawl 103 is not set in its transfer position as shown in Fig. 10, it is so far forward of the teeth of the ratchet wheel that the pawl 103 will not contact with the teeth of the ratchet wheel and will therefore, travel upward idly without actuating the ratchet wheel. It is also evident that in idle operations the lug 112 passes out of contact with the supporting shelf 113, and on the downward movement of arm 104 the pawl 103 is again restored to its normal cocked position, in the same manner as when a transfer is effected.

In order to prevent accidental displacement of the totalizer wheels when out of the engagement with the actuating segments 49 a series of pawls 119 is provided. Each pawl 119 is loosely pivoted on the shaft 109 and is urged rearwardly by spring 118. Pawl 119 carries a wedge shaped portion 121, which engages with an interdental space of the pinion 100, as best shown in Fig. 10.

*Totalizer engaging mechanism*

As previously stated the sub-totalizer "S" is provided in the present machine for accumulations of individual items comprising a sale and after the total standing thereon has been printed upon the itemized receipt the accumulating elements are returned to their normal or zero position, as an incident to accumulating another series of items of the successive transaction. The grand totalizer "G" is provided to accumulate the grand total of all items entered in the machine which involve the receipt of money.

Certain transactions such as "Charge", and "Paid out" do not involve the receipt of money and it is necessary of course, that operation of the grand totalizer be prevented while entering these types of transactions and in order that the sub-total of these quantities be printed it is necessary to provide means to rock the sub-totalizer into engagement with the actuating racks during each operation of the machine irrespective of the nature of the transaction.

This mechanism is best shown in Figs. 6 and 7.

Fixed to the rotation shaft 51 are complementary cams 150 and 151 (see Fig. 7) the peripheries of which cooperate with the studs 153 and 154, carried by an arm 152 pivotally mounted on a shaft 155 near the base of the machine. Mounted upon this shaft is a yoke or bail 158. The forward end of this bail is provided with an arm 157 which is secured by any desirable means to the forward part of the arm 152 at 156. From this it is evident that each time the shaft 51 is given a complete rotation the arm 152 and attached bail 158 will be oscillated. Advantage is taken of this oscillating movement to engage and disengage the grand and sub-total totalizers at the appropriate times. As stated previously the sub and grand totalizer elements are mounted upon shaft 201 and 202 respectively carried by suitable pivoted frames so as to permit them being rocked into mesh with the totalizers. In order to effect this rocking of the frames there is provided two counter control slides 160 and 1600 the upper end of each being slotted at 163 to embrace the shaft 200 of the detail printing type wheels, and the lower end of slide 160 at 1601 to embrace a stud 159 carried by the inner arm 1581 of the bail 158. The lower end of slide 1600 is not provided with a slot but is provided with a hole which receives the stud 159 so that movement of the arm 1581 is directly communicated to the slide 1600.

The cam plate 1600 is provided with a cam slot 161 which cooperates with the shaft 201 which carries the sub-totalizer accumulating elements while the cam plate 160 is provided with a cam slot 162 engaging the shaft 202 which carries the grand totalizer accumulating elements. It will be evident that whenever the two plates 160 and 1600 are moved downwardly the two totalizers will be thrown into mesh with the actuators.

It will be remembered that the lower end of the grand totalizer controlling slide 160 is not directly connected to the arm 1581 but the stud 159 is merely received by a slot 1601 formed in the lower end of the slide 160. The connection for communicating motion from the arm 1581 to the slide 160 will now be explained. Pivotally mounted upon the stud 159, which is also utilized as a guide stud for the cam plate 1600 as has been described heretofore, is a second cam plate 165 formed with a cam slot 168. A stud 164 secured to the slide 160 engages this slot and occupies at times, either the forward or the rear end of the slot 168. Whenever the "Paid out", or "Charge" key is depressed the stud will occupy the forward end of the slot, but upon the depression of the "Rec'd on acct." key the stud will occupy the rearward end of the slot as illustrated in Fig. 7. Likewise in "Cash" transactions, that is, transactions which do not require the depression of a transaction key the stud 164 will also occupy the position shown in Fig. 7.

From this it is evident that when the parts are in the positions shown in Fig. 7 motion from the arm 1581 has been communicated through the stud 159, cam plate 165 and the stud 164 to the cam plate 160 to rock the grand totalizer into engagement with the racks simultaneously with the engagement of the sub-totalizer.

The sequence of the operation of the parts just described will be explained, Fig. 7 showing the machine actually operated, both totalizers being in engagement with the racks. Upon a depression of the "Coupler lifting key" the coupler will be lifted to its coupling point and the rotation shaft 51 will be given a partial rotation in the direction of the arrow shown in Fig. 7 sufficient to allow the stud 153 to fall from the high portion of the cam 151 to the position shown in Fig. 7. The result of this movement will be to rock the vertical arm 152 of the bell crank lever and the horizontal arm 1581 to lower slide 1600 and 160 to throw the sub-totalizer and grand totalizer into mesh. Other keys may now be attached to the coupler and by depressing a selected amount key the shaft 51 will be rotated further, but the totalizer pinions will still remain in mesh with the actuating racks to be actuated an amount corresponding to the value of the keys depressed. Upon the completion of the downward stroke of the keys the cam plates 160 and 1600 will be rocked upwardly by the mechanism just described and the totalizers will be thrown out of mesh with the actuators and retained in that position during the upward stroke of the keys. Upon the return to normal the keys and cam plates 160 and 1600 will assume the position illustrated in Fig. 2.

*Totalizer throwout*

Upon operation of the "Paid out", and "Charge" keys it is desirable to prevent operation of the grand totalizer as explained above. This is effected in the present machine by providing the cam plate 165 with a cam slot 168 of such a configuration that it will raise the slide 160 when the cam plate 165 is rotated rearwardly from the position shown in Fig. 7 and this upward movement of the slide 160 is utilized for the purpose of throwing the grand totalizer out of mesh with the actuators without affecting the sub-totalizer.

The mechanism for rocking the cam plate 165 to disable the totalizer will now be described. Upon a horizontal shaft 172, near the front of the machine, is journalled a bail 169. The bail is provided with a downwardly extending locking arm 174 and at its other end has an arm 167 bifurcated at its lower end to engage a stud 166 secured to the plate 165. The bail 169 is further provided with a rearwardly extending arm 1168 to which is connected a coil spring 189, the opposite end of the said spring being attached to a tie bar 173 near the base of the machine. The transaction keys "Paid out" and "Charge" are each provided with a pin 182 adapted to ride along the forward face of camming levers 170 and 171 respectively which are loosely mounted on shaft 172. Each of the levers 171 and 170 is provided with a rearwardly extending arm 1701 which rests beneath the bail 169, and a downwardly extending cam arm 1711. When a key carrying a pin such as 182 is depressed it is readily seen that the camming arm 1711 will be rocked downwardly and rearwardly and the arm 1701 thereof will elevate bail 169, stretching spring 189 and shifting the arm 167 rearwardly, carrying with it plate 165 and thereby elevating slide 160 from the position illustrated in Fig. 6. From this it follows that if the "Coupler lifting key" 31 be depressed first the lowering of plates 160 and 1600 will cause both totalizers to be engaged, but a subsequent depression of one of the keys just mentioned will elevate plate 160 and thus disable the grand totalizer without effecting the sub-totalizer.

*Locking mechanism for throwout cam*

In order to prevent irregular and fraudulent operation of the machine by insertion of a wire or any other instrument in the key slots 34 to operate the throwout cam plate to disable the grand totalizer, it is desirable that the cam plate be locked after the actuators have begun to move.

As previously stated the bail 169 is provided with a locking extension 174. Pivoted upon the transverse shaft 155 is a bell crank 178 the forward arm of which is provided with a lug 177. The rearward portion of the arm has an elongated slot 180 receiving a stud 179 attached to the key coupler and a cam edge 181. The locking lug 177 may either engage a shoulder 175 or notch 176 depending upon whether the cam plate 165 is unoperated or operated respectively.

Assuming that the totalizer throwout cam has not been operated and the parts are in the position shown in Fig. 7 the sequence of operation is as follows. During the time that the "Coupler lifting" key is operated the coupler 36 will be raised, the stud 179 merely playing in the elongated slot 180 without imparting any movement to the bell crank 178. Further lifting of the coupler by depression of the keys causes stud 179 to engage and ride along the cam edge 181 forcing the forward end of the bell crank downwardly, thereby allowing lug 177 to engage the shoulder 175. The cam plate 165 is now locked in its unoperated position.

The operation of the parts is the same when the cam plate 165 has been shifted, with the exception that the lug 177 cooperates with the notch 176 instead of with the notch 175.

*Record strip printing wheels*

It is desirable that each time a sub-total of the items entered in the machine is printed upon the itemized receipt, the same amount be also printed upon a record strip. The record strip provides a complete record of all the transactions entered in the machine and at the end of a particular period may be detached from the machine and stored away for future reference.

The four recording elements 102 of the sub-totalizer shown in Fig. 8 have upon their peripheries printing type so that when a suitable impression means is actuated the sub-total standing thereon may be printed upon the itemized receipt. Each recording element 102 of the sub-totalizer has secured thereto a concentric sleeve 1021 mounted loosely upon the totalizer element supporting shaft 201. The sleeve 1021 which is connected to the units recording element has secured at its extreme left end (Fig. 9) a recording element 1022 which has its periphery engraved with a set of printing type. The remaining sleeves three in number which are secured to the dimes, dollars and tens of dollars recording elements have connected at their extreme left ends a series of pinions 1023 meshing with pinions 1024. Two of the pinions 1024 are sleeved over to a shaft 1025 journalled in the ears 81 and 810 of the accumulator frame 80. One of the pinions is fast to the shaft 1025, the said shaft being provided at its end with a pinion 1026 meshing with a pinion secured to the tens of dollars recording element 1022. The remaining pinions 1027 mesh directly with pinions secured to totalizer elements representing the dimes and dollars denomination.

From the foregoing it is obvious that each time the recording elements 102 are actuated, a similar movement is transmitted through the train of mechanism just described, to set up the recording elements 1022.

It is also obvious that a similar construction might be used to connect a second set of wheels to the item wheels 62 (Fig. 4) if it should be necessary or desirable to print the items as well as the totals thereof on the record strip 262.

Printing mechanism

The printing mechanism employed in the present machine and shown in the drawings is similar in principle and construction to that shown and described in the British patents to Fuller previously mentioned, the construction being modified to a minor extent to be adaptable for the present invention.

The entire printing mechanism is supported by said plates 268 (Fig. 4) the lower ends of which are provided with claws (Figs. 2 and 18) overlying the shaft 43. Normally the printing mechanism rests rearward in the position shown in Fig. 2 with lugs 269 contacting with a portion of the frame 24. The frame is normally in a position to print the items entered in the machine upon the itemized receipt, but may be rocked downwardly to print from either the sub-totalizer or grand totalizer as will be more clearly described hereinafter.

Journalled in the printer side plates 268 is a shaft 64 the extreme left end of which has fast to it a bell crank 650 clearly shown in Fig. 2. The horizontal arm 651 of the bell crank carries a roller 652 which co-acts with a box cam 63 fast to the shaft 51. As has been mentioned heretofore the shaft 51 is given a complete rotation during each operation of the machine and rotation of the box 63 will thereby rock arm 651 to actuate a platen and feed the record strip 262 as will be presently described.

Extending transversely of the printer side plates 268 and journalled therein, is a platen shaft 92 upon which is supported the platen 69 by means of forwardly extending arms 68 (Figs. 4 and 18) secured to the shaft 92. The under face of the platen is provided with a rubber impression block 690 clearly shown in Figs. 2 and 18.

Extending rearwardly from and secured to one of the platen arms 68 is a platen actuating arm 67, best shown in Fig. 3. The arm is provided with a lug 671 which is actuated by a hammer 70 to force the platen against the type to take an imprint.

The hammer 70 is formed as part of an arm 701 pivoted to the inside of the right hand printer plate 268 by a stud 76. The hammer 70 is forced upwardly by a spring 71 bearing against a lug carried by the right printer plate 268. The arm 701 is, furthermore, provided with a spring pressed hammer retracting pawl 72 having a tail bearing against an adjustable stop 75 on the arm 701. The pawl 72 has a lug 73 cooperating with a nose 74 formed as part of an arm 66 which is secured to the main printer operating shaft 64.

When the arm 66 is rocked clockwise (Fig. 3) by means of the bell crank 650 and shaft 64 to which it is secured, the nose 74 on the arm 66 will bear against the lug 73 of the pawl 70 and retract the hammer against the tension of the spring 71. Upon further movement of the arm 66 the nose 74 will clear the lug 73 of the pawl 70 and permit the hammer portion 70 to strike the lug 671 of the arm 67 and rock the platen downwardly to effect a printing impression from the type carriers.

The machine is further equipped with an inking ribbon 93 (Fig. 2) but since the ribbon feeding mechanism comprises no part of the present invention it will not therefore be described in this application.

It is to be understood that both the record strip and itemized receipt paper pass between the underside of the inking ribbon 93 and the type carriers as well be presently described.

Record strip and itemized receipt feeding mechanism

The paper supply roll 253 for the record strip 262 is carried by a shaft 265 (Fig. 5) which in turn is carried by the lower end of a rock arm 251 best seen in Fig. 18. The rock arm 251 is pivoted to a U shaped frame 266 by a stud 252. The frame 266 is pivoted to the left hand supporting frame at 267 (Fig. 2). The purpose of providing this construction is to allow the upward rotation of the frame 266 about its pivot carrying with it the rock arm 251 and the supply roll 253 so that the record strip supply roll may be readily replenished.

The rock arm 251 as aforesaid is pivoted at 252 to the U shaped frame 266 and carries at its lower end a guide roll 254 (Fig. 18) and at its upper end a second guide roll 261. Secured to the U shaped frame 266 are guide rolls 255 and 256. The pivot 252 for the rock arm 251 is formed as a transverse shaft upon which is mounted a storage roll 260 (Fig. 5) for the record strip. Between the storage roll 260 and the rock arm 251 is a ratchet wheel 271. Pivoted upon the rock arm 251 is a spring pressed feeding pawl 259 the engaging end of which is in the plane of the teeth of the ratchet wheel 271. A second pawl 2691 pivoted upon the frame 266 is provided for preventing retrograde movement of the ratchet wheel 271.

The upper end of the bell crank 650 is equipped with a notch which cooperates with a stud 250 secured to the rock arm 251 so that each movement of the bell crank is imparted to the rock arm 251.

As shown and described in the Fuller application S. N. 263,125 hereinbefore referred to and the British patents previously mentioned, the record strip 262 passes from the supply roll 253 (Fig. 18) under the rollers 254 and 255, over roller 256, over the platen supporting shaft 92 under the rubber impression block 690 of platen 69, passing over rollers 256 and 257, back over itself on shaft 92, over the roller 261 and thence on to the storage roll 260.

From the foregoing it will be evident that when the bell crank 650 is actuated during an item entering operation the rock arm 251 will be oscillated clockwise from the position shown in Fig. 2 to the position shown in Fig. 18. During the clockwise rocking of the arm 251 the supply roll 253 will be moved rearwardly and the storage roll 260 will be held stationary due to the co-operation of the retrograde pawl 269 with the teeth of the ratchet wheel 271. This will tend to shift the part of the paper which is over the platen 69 from its original position to a position under the impression block and in so doing the paper will be partially wound on the storage roll, the feeding pawl 259 moving idly over the teeth of the ratchet wheel 271 to engage the next tooth of the said ratchet wheel. Upon the return of the bell crank 650 the paper will be shifted back to its normal position and the feeding pawl 259 will cause the bell crank and storage roll 260 to move in unison and thereby retain on the storage roll the paper wound thereon by the clockwise movement of the bell crank.

It is clear that in the present embodiment no printing of items on the record strip will take place during item entering operations, the record strip merely being fed an increment each time. It is only when the platen 69 is rocked forwardly so that the sub-total may be printed from the printing elements 1022 that printing on the record strip ever occurs. The sub-totals printed upon the record strip will be spaced as illustrated in Fig. 26 and the spacing between successive printed sub-totals may be conveniently utilized for entering written notations, the cabinet 25 being cut away at 800 to permit this, as is seen from an inspection of Fig. 1.

As is best shown in Fig. 5 the itemized receipt supply roll 264 is mounted upon the shaft 252 which carries the storage roll for the record strip 262 the two being spaced by means of a washer 2695.

The itemized receipt paper strip 263 (Fig. 18) is led from the supply roll 264 under an extension of roller 255 over an extension of roller 256, over shaft 92, under the platen and over the rollers 258 and 257. After leaving the roller 257 the paper is not led backwards as in the case of the record strip, but passes between rollers 416 and 420 and then through a slot 4210 in the cabinet 25 clearly shown in Fig. 1.

It is of course necessary that each time an item is printed upon the itemized receipt the receipt paper be fed forward an increment, the means for accomplishing this being best shown in Figs. 16 and 17.

It might be noted here that the receipt paper receives two different feeds, one when items are entered by depression of amount keys, and the other when the sub-total lever 450 is pulled forward to issue the itemized receipt. The first of these feeds is accomplished through the shaft 404 as will be now explained, while the latter is accomplished through the shaft 405 as will be explained later.

Secured to the rotation shaft 51 is a box cam 414 (Figs. 5, 16 and 17) formed with a cam groove 415 which cooperates with a roller 413 carried by a rearward extension of an arm 401 loosely pivoted on the segment shaft 43. The configuration of the cam groove is such that the arm 401 will be oscillated during each operation of the machine.

Attached to the front tie bar 23 is a pair of supporting frames 400 and 4000 (Figs. 4 and 16) which support the itemized receipt paper feeding mechanism. Journalled between the frames are two shafts 404 and 405 and secured to the shaft 404 is a resilient feeding roll 416 (see also Fig. 22) while the shaft 405 has journalled thereon a roll 420 equipped with a suitable electro 4200 (Fig. 21) for printing any desired matter on the issued check.

The means for securing the resilient feeding roll 416 to the shaft 404 comprises a spider 4041 (Figs. 20 and 22) secured to the said shaft. The shaft 404 has loosely mounted upon it two circular discs 417. The area of contact between the faces of the discs 417 and the side of the roll and the force exerted by the rubber against the discs is sufficient to allow the roll 416 to be driven by rotation of the disc 417.

In contact with the resilient feeding roll 416 are two discs 418 loose upon the transverse shaft 405 and rotatable independently of the roll 420 and the two discs 430 and 431 secured to the shaft 405. It is to be noted that the periphery of the discs 430 and 431 are normally relieved from contact with their related discs 417 by a cut away portion 471 (best shown in Figs. 28 and 29) so that the roll 416 may be given a step by step movement for the purpose of spacing for items without rotating the shaft 405.

The itemized receipt paper is substantially the width of the roll 416 and passes between the roller 416 and the discs 418 and roller 420. The roller 420 carriers an electro 4200 which normally (Fig. 22) is in a position contacting with the paper strip so that the step by step movement of the roller 416 will also rotate the electro to imprint a heading upon the issued receipt simultaneously with the printing and spacing of the items.

Secured to one end of the shaft 404 is a ratchet wheel 407 (Figs. 16 and 20) with the teeth of which cooperates a feed pawl 408 carried by a feeding arm 403 loose on shaft 404. A spring 409 insures continuous engagement of the pawl 408 and the ratchet teeth. To prevent retrograde movement of the roller 416 after being fed there is provided a second ratchet wheel 410 which cooperates with a retaining pawl 411 loosely pivoted on shaft 405 urged by a spring 412 as shown in Fig. 23. The lower end of the arm 403 is provided with a slot which receives a stud 402 carried by the upper end of the arm 401. The resiliency of the roll 416 is sufficient to frictionally hold the paper strip against the discs 418 so that a rotation of the roll 416 will feed the paper a step during each item entering operation while the discs 430 and 431 remain stationary.

From the foregoing it is evident that each time the arm 401 is oscillated the feed pawl 408 will rotate the ratchet wheel 407 and feed roll 416 an amount to properly space the printed items.

It will be remembered that the actuators 49 rotate the item printing wheels 62 an amount corresponding to the value of the operating keys and the operation of the printing hammer 70 at substantially the end of the down stroke of the operating keys as previously described will therefore cause the printing of the individual items upon the itemized receipt 263. After printing each item the receipt paper is fed forward as has just been explained in detail.

*Printing of sub-totals on the record strip and itemized receipt*

After the series of items which constitute a particular transaction has been entered in the sub-totalizer and the various amounts printed upon the itemized receipt, the total accumulated by the sub-totalizer "S" is printed upon the record strip and the itemized receipt.

A manipulative device is provided for accomplishing this. Printing of the sub-total by manipulation of this device will also accomplish certain other work, such as feeding the record strip an increment, and operating the electro 4200 to complete the printing upon the check strip of the advertising matter, and "clear" or reset the sub-totalizer to zero to prepare for the accumulations of the items comprising the subsequent transaction. A suitable alarm is also rung and the cash drawer is released so that the money received may be deposited. Accomplishment of these functions will be taken up in order in detail under appropriate captions.

In order to take a sub-total it is necessary to rock the printing mechanism forward so that the platen 690 overlies the sub-totalizer printing elements, actuate the platen and then rock the printing frame again to its rearward or normal position.

The manipulative device 278S is shown clearly in Fig. 3 as being formed as a part of the lever 66. Fig. 3 shows the manipulative device in its normal position with the platen 690 overlying the item type wheel 62, Fig. 18 shows the printer frame rocked forward to take a sub-total while Fig. 17 shows the manipulative device 278S with the printer frame removed.

The manipulative device 278S has secured thereto a stud 274 which cooperates with a groove 275 eccentric with the shaft 51 and formed in the right hand side of the right hand supporting frame 26 which, it will be recalled, serves as a support for the totalizers and item printing wheels. The frames 26 are adjacent the printer supporting plates 268, as is shown in Fig. 4, the right hand supporting frame being shown by the dash dot line of Fig. 17.

By gripping the manipulative device 278S with the fingers and drawing it and the printer frame forward, the stud 274 will enter the cam groove 275 and further movement of the printer frame will cause a counter-clockwise rotation of shaft 64 the same extent that the box cam 63 rocks it during a regular operation of the machine. The cam groove 275 is so proportioned that it will release the hammer 70 for effecting a printing impression at substantially the time that the platen 690 overlies the sub-total printing elements as illustrated in Fig. 18. The end of the groove 275 serves to stop the forward movement of the printer frame when it is in its proper position to print a sub-total.

From an inspection of Fig. 17 it is seen that the manipulative device is located under a lid attached to the cabinet which ordinarily is locked and in order to place the printing from the sub-totalizer under control of the clerk, a special manipulative device 450 is provided. The lever 450 is loosely pivoted upon the shaft 43 the upper end projecting through a slot 4500 as shown in Fig. 1, formed in the casing. The lever 450 is provided with a bent over lug 452 which overlies a stud 453 secured to the manipulative device 278S.

It is to be noticed at this time that even though the printer frame has been rocked forward to print a total the center of gravity of the printing mechanism is still to the rear of the shaft 43 about which it is pivoted so that the printer frame will tend to return to its normal position after a sub-total has been printed. In returning to its normal position the stud 453 will act to draw the manipulative device 450 to its normal position. When the sub-total printing device is manipulated the detail record strip will be fed in the manner as described in connection with feeding the record strip during an item entering operation. The only difference in sub-total printing is that since the platen 690 and the record strip now overlies the printing elements 1022 which move in unison with the sub-totalizer accumulating elements 102, the total standing thereon will be printed upon the record strip which will be fed rearward so that the last printed sub-total is in full view of the operator of the machine, as is clearly shown in Fig. 1.

*Mechanism for completing the printing from electro on the itemized receipt and for feeding the same during sub-total operations*

After the sub-total has been printed it is necessary to feed the itemized receipt paper, and it is desirable at this time to complete the printing from the electro if the same was not already accomplished by the printing of items.

The driving means for the roller 420 is under control of the sub-total manipulative device 450. Referring to Fig. 16 it will be seen that the said device is provided with an extension 460 carrying teeth which are in mesh with a pinion 461 loose on a stub shaft 462. Shaft 462 (see Fig. 4) is journalled between the supporting frame 400 and a bracket 463 carried thereby. Secured to the pinion 461 is one element 464 of a clutch, the other element 465 being pinned to the shaft 462. The faces of the clutch elements 464 and 465 are provided with projecting teeth so disposed that a rotation of the shaft 462 will not be effected during a forward movement of the manipulative device 450, the teeth merely ratcheting over each other, but will be turned during the return movement of the manipulative device. A spring 4611 serves to hold the elements 464 and 465 of the clutch together for driving, while permitting an idle movement of 464 relative to 465 when no driving is to be effected. Secured to the shaft 462 inside of the support 400 is a pinion 466 (see Figs. 4, 16 and 17) meshing with a pinion 4671 loose on a stub shaft 425 carried by one of the supporting frames 400.

The pinion 4671 just mentioned is directly in mesh with a pinion 468 secured to one end of the shaft 405, Fig. 20. To prevent retrograde movement of the shaft 405 there is provided a ratchet wheel 406 fixed to shaft 405 (Figs. 20 and 23), the teeth of which are engaged by a spring-pressed retaining pawl 469 pivoted loosely on shaft 404, the pawl 469 and the pawl 411 being held to their respective ratchet wheels by a common spring 4691 (Fig. 23).

Loosely mounted upon the shaft 405 and between the discs 410 is a segmental roller 420 secured to the periphery of which is the electro 4200. The roller has a cutaway slot 4201 the ends of which are adapted to cooperate at times with a pin 4202 projecting diametrically through the shaft 405.

The sequence of the operation of the parts just described will now be given. Referring to Fig. 26 there will be seen a sample of an itemized receipt issued by the present machine. The heading bears a suitable imprint in the nature of an advertisement having the name of the proprietor and other suitable printed matter.

As has been explained heretofore the step by step movement of the shaft 404 will rotate the electro 4200, by its contact with roller 416, simultaneously with printing of the items, the electro and roller 416 being at the start of the entry of a series of items, in the position shown in Fig. 22. As the roller 416 rotates the electro 4200 also rotates and prints upon the paper until the electro assumes the position shown in Fig. 21, where it will be seen that the electro has completed its printing and will be rotated no further by roller 416 because of the loss of contact therewith, the shaft 405 and pin 4202 being held stationary during this time. It will be noted that after the roller 420 loses contact with roller 416, the paper will be fed during subsequent item entering operations by the pressure of roller 416 against the discs 418. The amount that the electro imprints, will, of course, depend upon the number of items printed and if a sufficient number have been printed, the electro will assume the position shown in Fig. 21. However, if only one or two items have been entered the electro will assume an intermediate position. When left in this position, the return stroke of the sub-total printing device will rotate the shaft 405 sufficiently to allow the pin 4202 to pick up the roller carrying the electro so that the latter makes a complete impression upon the issued receipt.

In taking a sub-total the paper strip is held by the paper feeding mechanism and the forward movement of the platen from the Fig. 2 to the Fig. 18 position will unwind the check strip 263 from its supply roll and bring a fresh strip of paper which is just to the rear of the last printed item over the sub-total accumulating elements (Fig. 18) where the total will be printed next to the last printed item, the separation of the two being substantially equivalent to the spacing between the successive printed items as is seen in Fig. 4.

While the manipulative device 450 is being returned to its normal position the paper will be fed forward by virtue of the engagement of the teeth on the clutch members 464 and 465 and through the train of mechanism just described will rotate the shaft 405 in a counter-clockwise direction (as viewed in Fig. 16) feeding the paper outwardly through the slot in the cabinet.

As the shaft 405 is being rotated by the return stroke of the sub-total printing device the discs 430 and 431 will be rotated sufficiently to withdraw their cutaway portions 471, so that the peripheries of each pair of discs will now contact with each other thus rotating the roller 416 to feed the paper. Rotation of shaft 404 by this means is made possible because the ratchet wheel 407 is free to rotate under the pawl 408. As the shaft 405 rotates from the position shown in Fig. 21 the pin 4202 will contact with the edge of the slot 4201 formed in the electro roller 420 thereby rotating it clockwise, bringing the electro to the position shown in Fig. 22. At this time the manipulative device and printer frame have been returned to their normal position and the issued receipt will have been fed completely out of the cabinet where it can be readily detached and given to the customer or filed away as in the case of some store transactions.

In order to ink the electro there is provided a felt inking roller 421 (see Fig. 24) saturated with a suitable printing ink. The roller 421 is journalled loosely on a shaft 4251 carried by side members 422 and 4250, the member 422 being pivoted to the left supporting frame 4000 by a stud 423. A coil spring 424 wound around the stud 423 urges the inking roller 421 upwardly so that it contacts with the electro 4200 as it is rotated during a printing operation.

*Means for sounding an alarm when issuing an itemized receipt*

It is desirable in machines of this class to sound an alarm, such as a bell or an equivalent, when the operator is obtaining a sub-total of the items entered into the machine.

The bell 500 which is clearly shown in Fig. 5 and is secured by any desirable means to one of the slide frames 20 is adapted to be struck at the proper time by a bell hammer 501 which is secured to a rock shaft 502 journalled between the side frames 26. Also secured to the rock shaft 502 is a rock arm 506 (see Fig. 17) provided with a bent over lug 507 which is in the plane of a trip arm 503 pivoted to the sub-total manipulative device 450. Supported by ribs integral with the rear supporting frame is a rod 510 (Fig. 5). A spring 504 (Fig. 17) interposed between the sub-total manipulative device 450 and the trip arm 503 urges the trip arm 503 downwardly so that a cam edge 509 formed at the extreme end of the trip arm 503 contacts at all times with the rod 510. The arm 503 is also provided with a trip lug 505 (Fig. 16).

As is clearly shown in Fig. 15 a spring 559 is connected to a stud 571 carried by a resetting segment 560 (Fig. 15) the other end being secured to a stud 5591 carried by one of the frames 26 (Fig. 5). The tension in this spring tends to force the bell hammer 501 against the bell 500, as well as to assist in the returning of the manipulative device 450.

The result of the above construction is that whenever the sub-total device is drawn forward from the position shown in Fig. 16 to that illustrated in Fig. 17 the spring 504 will urge the trip lug 505 downwardly upon the lug 507, until it assumes the position shown in Fig. 17. When the sub-total manipulative device is moved rearwardly the lug 505 will force the rock arm 506 and the bell hammer 501 rearwardly, the cam edge 509 in the meantime contacting with the rod 510. At the proper time the arm 503 will be cammed upwardly a sufficient extent to withdraw the lug 505 from the lug 507 whereupon the bell hammer 501 will be released to allow the spring 559 to force the hammer against the bell 502 and ring the same.

*Drawer releasing mechanism*

The drawer releasing mechanism is operated so that the drawer is released at each operation of the sub-total manipulative device. This mechanism is best shown in Figs. 4 and 15.

Pivoted to the base of the machine is a drawer catch release lever 518 provided with a pin 317 and a hook 318. The lever 518 is adapted to hook over a drawer catch 319 which is pivoted at 331 to a frame piece 328 attached to the base of the machine and is provided with a hook 321 which cooperates with a bracket 326 carried by the cash drawer which is normally urged outwardly by a spring (not shown). A spring 316 connects the drawer release lever 318 and the drawer catch 319.

Secured to the rock shaft 502 by a pin 564 is a trip arm 515 provided with a forward extension having a cam edge 519 adapted to engage the pin 317 and lift the drawer catch release lever 518 at the appropriate time.

The result of the above construction is that whenever the shaft 502 is rocked by the rearward movement of the latch 503 the cam edge 519 of the arm 515 will engage the pin 317 thereby releasing the hook 318 from the drawer catch 319 permitting the drawer to fly open. A bent over lug 3291 on an extension of the frame piece 328 projects into the plane of an extension 3202 of the drawer catch 319 and serves to limit its rocking movement.

Resetting the sub-totalizer

Resetting the sub-totalizer wheels is accomplished by rotating the totalizer shaft 201 so that the usual resetting pawls will pick up the differently positioned wheels and rotate them until they all stand at zero. The mechanism for controlling the resetting of the sub-totalizer is under control of the sub-total manipulative device.

Referring to Figs. 8 and 9, it will be seen that the sub-totalizer shaft 201 has secured at its extreme right hand end a resetting pinion 558 which may be meshed with a resetting segment 560 at the desired time.

The portion of the shaft 201 which supports the recording elements 1022 is provided with four notches 556 which are adapted to cooperate with the usual resetting pawls 557 pivoted to the recording element 1022, Fig. 8. The notches 556 are not normally in line of movement of their respective resetting pawls so that it is necessary to slide the shaft 201 in a longitudinal direction against the compression of a spring 555 so that the pawls and notches come into coacting relation. This shifting of the shaft 201 is accomplished by the forward movement of the printer frame. The lateral movement of the shaft will, of course, bring the resetting segment 560 into mesh at the appropriate time.

The means for shifting the shaft 201 is best shown in Figs. 4 and 18. Pivoted upon the left intermediate supporting frame 26 is a lever 554 the forward end of which has a camming projection 551. Secured to the left side of the printer frame 268 over and to the rear of a cam edge 553 on lever 554 is a stud 552 provided with a suitable anti-friction roller.

From the above it is clear that whenever the printer frame is rocked forwardly the forward end of the lever 554 will be cammed upwardly and the cam 551 on the lever by engagement with the shouldered portion 550 on the shaft 201, will force the shaft 201 toward the right (Fig. 4) thereby bringing the notches 556 in alinement with the resetting pawls 557.

While the sub-total manipulative device 459 is moved downwardly from the position shown in Fig. 16 to that illustrated in Fig. 17 the shaft 201 will be moved longitudinally until the resetting pinion 558 is meshed with the resetting segment 560. As will later appear, the resetting segment 560 remains stationary during this shift. The parts now occupy the position shown in Fig. 15 wherein it will be seen that the resetting rack is in its upward position.

The resetting segment 560 (Fig. 15) is loosely mounted upon shaft 43 and is provided with a rearward extension 561 slotted so as to engage a stud 562 carried by a forwardly extending arm 563 pinned to the rock shaft 502.

As the shaft 502 is rocked during the return of the manipulative device 459 the resetting segment will be rocked downwardly, rotating the resetting pinion 558 until the resetting pawls 557 turn the differentially positioned wheels to their zero position.

Although the first movement of the printer frame is sufficient to shift the shaft 201 laterally so as to hold the shaft 201 in its longitudinally moved position other means may also be provided to assist in holding the shaft 201 while the resetting segment is rotating the shaft 201 to reset the totalizer wheels. To this end a stationary ear 82 (Figs. 8 and 9) is provided with a pin 570 normally in engagement with a hole in the resetting pinion 558. As soon as the shaft 201 and pinion 558 are moved longitudinally and the pinion 558 slightly rotated by the resetting segment the pin 570 is no longer in alignment with the hole and will hold the shaft 201 and pinion 558 in its resetting position in mesh with its corresponding resetting segment 560. When the resetting segment 560 is fully downward the totalizer wheels will now all stand at zero and at this time the pin 570 is again in line with the hole in the resetting pinion 558. The spring 555 will now shift the shaft 201 to withdraw the resetting pinion from meshing with the resetting segment 560. The said segment is now free to be drawn upwardly and to assist its return to its home position the spring 559 is provided.

In order to permit engagement of the pinion with its segment only when the segment is in its home position there is provided an enlarged tooth 572 (Fig. 17) engageable with a recess 573 (Fig. 15) in the segment. It will be seen that the pinion cannot mesh with the segment except when the wide tooth 572 is in alinement with the recess 573.

Printing from the grand totalizer

At the end of the day's business, or, in some cases, at the termination of an arbitrary period the totals of all the items entered into the machine is usually obtained, which operation is well known in the art as "taking of a grand total." After this has been obtained the totalizer is usually cleared as an incident to accumulating the items comprising the business transacted during a subsequent period.

To take a grand total all that is necessary is to swing the printer frame to its lowest position until the platen is directly over the grand totalizer and when the platen is in this position it will be automatically actuated and the total standing upon the wheels will be printed upon an inserted slip. This procedure is quite similar to that in taking a sub-total with the exception that the printer frame is rocked downwardly a greater extent when taking a grand total.

Reference to Fig. 4 will show that since the width of the totalizer wheels of the grand totalizer is greater than the combined width of the itemized receipt paper and the record strip it will be impossible to print a grand total upon either of these or both, so it is necessary to insert a separate piece of paper between the ribbon and the type carriers.

Fig. 19 illustrates the manner of accomplishing this. The printer frame is provided with suitable guide plates for the paper and inking ribbon as is explained and shown in detail in the patent to Raymond E. Rice #1,554,671, dated September 22, 1925. The itemized receipt and record strip paper are withdrawn from the printer frame and a piece of paper, inserted between the guide plates and the platen 690, is substituted therefor. Printing of the grand total will now take place upon the inserted slip.

To rock the printer downwardly there is provided a grand total manipulative device 278G (Figs. 4, 5 and 18) which is integral with the right printer side frame 268. Referring to Fig. 17 it will be seen that the supporting frame 26 is provided with a second slot 276 more eccentric and longer than the slot 275 previously referred to. The stud 274 referred to hereinbefore is adapted also to cooperate with the slot 276. When the printer frame is pulled forward the stud 274 will enter the slot 276 and cause a relative turning movement of the shaft 64 thereby retracting and releasing the hammer 70 for printing at substantially the time the platen is over the grand totalizer.

It is of course understood that the proprietor or other authorized persons are the only ones who should be able to obtain a grand total and for this reason a lock is provided for preventing unauthorized persons from printing a grand total even though they may be able to obtain access to the total printing device 278G by opening the upper lid 285. Disabling of this lock to permit rocking of the printer frame to take a total is under control of a lock, the key of which is retained by the proprietor. The details of construction of this mechanism will be explained hereinafter under the heading "Lock for the grand total printing device."

*Resetting the grand totalizer*

After a grand-total has been printed upon the inserted slip it is desirable to restore the accumulating elements to their zero position as an incident to accumulating items entered during a subsequent period of business.

The means for accomplishing this is best shown in Fig. 15. It will be remembered that the resetting segment 560 is provided with a stud 571. This stud is just forward of a grand total resetting lever 5701 loose on shaft 43. The resetting segment is provided with a lower set of teeth similar to that provided for resetting the sub-totalizer wheels. The grand totalizer shaft 202 is provided with a pinion 558 (Fig. 17) to engage this set of teeth, and is also provided with resetting notches to cooperate with resetting pawls similar to those described in connection with the sub-totalizer. To shift the shaft 202 longitudinally to bring the pawls in alinement with their corresponding notches the grand totalizer shaft is provided with a thumb piece 299 (Fig. 4).

In order to be able to shift the shaft 202 longitudinally it is necessary to open the front lid 286 which as stated previously can only be accomplished by the proprietor.

The shaft 202 is shifted to the right by pressing on the thumb piece 299 (Fig. 4) with the left hand and the resetting lever 5701 pulled downwardly by the right hand to engage the resetting segment 560 (Figs. 4 and 17) with the resetting pinion, the resetting pawls (similar to pawls 557, Fig. 9) will then engage their respective notches in shaft 202, so that rotation of the latter will reset the totalizer wheels to zero, after which the lever 5701 will be returned to its normal position by the spring 559 until the lever 5701 strikes a pin 5721 carried by the intermediate supporting frame 26.

*Machine and key locking mechanism*

As previously described, independent devices are provided for entering items and for recording the sub-total and as it is undesirable to permit simultaneous operation of these two devices to avoid disarranging some of the mechanism and the confusion caused by the printed record the following interlocking devices are provided.

Fast to the rotation shaft 51 is a disc 527 (Fig. 16) provided with a locking slot 529. Pivoted to the sub-total manipulative device 450 by means of a screw 526 is a rearward extending locking arm 525 bifurcated to engage the rotation shaft 51 and provided with a lug 528 adapted to contact with the periphery of the disc 527 or register with the locking slot 529 at the appropriate time.

From the above it will be seen that whenever the device 450 is operated the lug 528 will enter the locking slot 529 and thereby lock the item recording means against operation and conversely when the shaft 51 is rotated by operation of the item recording means the lug 528 will bear against the periphery of the disc 527 and thereby prevent movement of the sub-total manipulative device 450.

*Centralized control mechanism*

It is desirable that the cash register disclosed in this invention be capable of being operated in 15 different ways, as, for example, permitting the numeral keys to be depressed while the cash drawer is open, or require the cash drawer to be completely closed in order to operate the keys, or to lock the machine against item entering operations, or to condition the machine for resetting the grand totalizer and taking a total therefrom and simultaneously releasing the cash drawer.

This mechanism comprises an adjustable lever 301 (Fig. 15) which is loosely pivoted upon the segment shaft 43 and may occupy and be locked in any one of four positions for accomplishing the above results.

The locking lever 301 is provided with a handle extending through and slidable in a slot in the cabinet and provided with a pointer movable over a suitable scale bearing at proper points, the words "Lock register", "Open drawer", "Closed drawer", "Total and Reset".

Attached to the side frame 20, as by screws 950 is a bracket 951 supporting a lock 952 provided with a bolt 953 slidably mounted in bent ears 954. The bolt may be engaged in one of the three holes 955.

The barrel of the lock is provided with a bell crank the shorter arm of which is connected to the bolt 953 and the longer arm has a circular portion 956 received in a slot in the end of lever 303 mounted on the shaft 43. The lever 303 is provided with a forwardly extending arm 304 having an ear 960 located adjacent the projection 305 rigidly connected to the key coupler. In the position shown the projection 305 will clear the ear 960; but whenever the lever 301 is moved to its lowest position (the next lower one to that shown in Fig. 15), the ear 960 will interfere with the projection 305 and prevent operation of the machine.

The locking lever 301 is provided with a gear sector 307 meshing with a gear sector 308 secured to the right hand end of the key shaft 32 (Fig. 4). Also secured to this shaft is a somewhat larger gear sector 309 meshing with another gear sector 310 rigidly mounted on a transverse shaft 155 which carries a cam shaped plate 330 capable of being moved to different positions by adjustment of the control lever 301.

The cam plate 330 is provided with a nose 326 adapted to engage a stud 340 carried by the forward end of the drawer catch release lever 518. The drawer catch release lever is provided with a rearwardly extending hook 313 adapted to engage the coupler 36. Mounted adjacent the drawer catch release lever 518 is a slide 312 bifurcated at each end to engage the stud 327 and the shaft 155, the said slide being equipped with a hook similar to the hook 313 and a stud 311 engaging a slot formed in the cam plate 330.

The parts are shown set for "Closed drawer"

operations. When the drawer is released by operation of the sub-total taking device 450 the rear end of the drawer catch release lever will no longer be supported by the drawer catch 319 and the spring 316 will force the hook 313 to overlie the coupler thus preventing the operation of the machine until the drawer is again closed.

If the control lever 301 be moved forwardly one step to "Lock register" position the cam plate 339 will be moved clockwise and by means of the stud 311 will force the hook integral with the slide 312 rearwardly until it overlies the coupler thus preventing any operation of the machine.

If the control lever be moved rearwardly one step to "Open drawer" position the hook will be disengaged from the coupler and the nose 326 will now overlie the stud 340 thus preventing the hook 313 from engaging the coupler 36. It will, therefore, be possible to operate the machine without closing the drawer between operations.

When the control lever is moved to "Total and reset" position the cam plate will be rotated counter-clockwise an additional step thereby rocking the drawer catch release lever 518 about its pivot and release the drawer When adjusted to this position the machine will be conditioned to allow printing of the total from the grand totalizer by releasing a lock, as will be presently described. The two lids will also be unlocked and the proprietor may have therefore full access to all the mechanism permitting him to condition the machine for entering further items comprising a subsequent period of business.

The mechanism described under this heading for accomplishing the results just set forth are briefly described in this application and for a fuller and more complete showing reference may be had to the pending application bearing S. N. 263,125 filed by Frederick L. Fuller and the British patents previously mentioned.

*Lock for grand total printing device*

As premised hereinbefore the present machine is equipped with a lock to prevent movement of the printer frame to print a grand total by unauthorized persons even though they may have access to the grand total printing device 278G.

The right side of the printer frame 268 is provided with a laterally extending stud 565 (Fig. 4) which is in the plane of a rearwardly extending arm 566 secured to a transverse shaft 325 journalled between the side frames 20. The normal relation of the stud 565 and arm 566 is such that a sub-total may be printed without any interference with the movement of the printer frame.

If, however, an attempt is made to print a grand total by pulling the grand total printing device 278G forwardly, movement of the printer frame past the sub-total printing position will be prevented by coaction of the stud 565 and the rearward edge of the arm 566. To disable this lock the shaft 325 is rotated a partial amount. Rotation of this shaft is effected whenever the centralized control lever is set to its reset position, the mechanism for accomplishing this being illustrated in Fig. 15.

The forward arm 306 of the control lever is provided with upwardly and downwardly extending portions 861 and 869 provided with cam edges 862 which coact with rollers 863 carried by a bell crank 864 secured to the shaft 325. The result of this is that whenever the control lever is adjusted to its "Reset" position shaft 325 will be rocked to permit rocking of the printer frame to take a grand total.

This adjustment of the control lever to its "Reset" position also releases the lids 285 and 286 so that the proprietor may have access to the grand totalizer to engage it for resetting. This releasing by movement of the control lever is not shown in the present case, but is fully shown and described in United States Letters Patent No. 1,842,546 to Charles W. Green.

*Modification of the control lever*

A modified form of mechanism, differing from the form disclosed in Fig. 15, for locking the control lever referred to hereinbefore in its different adjusted positions, is also a part of the present invention. The modified construction which will now be described is concerned only with the manner of attaching the lock to the control lever and other details of construction of the connections from the lock to the mechanism controlled, while the general manner of controlling the operations of the machine in different ways is in no wise changed. Figs. 1 and 25 clearly illustrate the improvements which will now be set forth.

The control lever 608, as heretofore, is loosely pivoted upon shaft 43 and has secured thereto a concentric plate 609 slidable beneath the cabinet 25 of the machine. The plate 609 carries a pointer 610 (Fig. 1) slidable in a slot formed in a second plate 615 carried by the machine cabinet, the said plate having at the desired places engraved characters and words representing the different modes of operating the machine. The lock 600 may be attached to the concentric plate 609 by any desirable means, the barrel 616 projecting through a slot 601 formed in the plate 615, as shown in Fig. 1.

The bolt of the lock is provided with a flange 602 adapted to engage suitable notches 603 in a plate 604 secured by any desirable means to the side frame 20. The plate 604 is provided with guide ears 617 cooperating with slots formed in extensions 619 of the plate 609. The flange of the bolt is furthermore provided with a slot 620 which is adapted to be brought in the plane of the plate 604 by rotation of the bolt. For aligning the control lever in its set position there is provided an aligning pawl 605 carrying a stud 607 urged upwardly by a spring 606 to engage the V shaped notches 1608.

To adjust the lever to any desired position all that is necessary is to insert the key in the lock to rotate the key a quarter turn to bring the notch 620 in the plane of the plate. By moving the key and parts movable therewith so that the index points to the desired position and then giving the key a quarter turn in the reverse direction the flange 602 will cooperate with the desired notches 603. Removal of the key will lock the control lever in its set position.

*Operation*

The operation of the various mechanisms has been explained in connection with a detailed description of the mechanisms, but a brief statement of the general operation of the machine as a hole is thought desirable and will now be given.

Assume that the sale just transacted amounts to $7.45 composed of individual items of $1.30, $4.00 and $2.15, the transaction in this instance being a cash sale. Assume also that the machine is in a "Closed drawer" condition. The clerk first depresses the key 31 to lift the key coupler to coupling position where it is arrested and held. The keys 10 denoting $1.00 and $0.30 are next partially depressed until all the keys necessary are latched to the coupler 36. By next completely depressing any of the partially depressed keys 10 the item is entered into the machine. When the key 31 was depressed the sub and grand totalizers were both thrown into mesh with the actuators 47. Upon depression of the keys 10 the accumulator wheels of the two totalizers will be actuated a differential extent by the actuators, the amount of the sale $1.30 also being set upon the item type carriers 62. At the end of the downward stroke of the keys the totalizers will be thrown out of mesh and the platen 69 actuated to imprint the amount $1.30 upon the itemized receipt. Upon the return stroke of the keys the record strip will be fed backwardly while the receipt paper will be fed forward a slight extent, the electro in the meantime imprinting upon the receipt paper, and the latter being fed forward a slight amount through the slot 4210. The indicators will have been raised and held in their elevated position, indicating the amount of the sale as well as the nature, the transaction indicated in this instance being "Cash."

The next item, namely, $4.00 is then entered into the machine in a similar manner and then the last item $2.15.

The sub-total device 450 is now drawn forward, resulting in the printer frame being drawn downwardly until the record strip and itemized receipt paper is over the sub-totalizer elements and at this time the platen 69 will be actuated to print the sub-total $7.45 upon the record strip and itemized receipt paper. While the printer mechanism was being drawn downwardly the sub-totalizer shaft 204 was being shifted longitudinally to bring the resetting pinion 559 in mesh with the resetting rack 569.

As the sub-total manipulative device returns to its home position the driving rack 460 will rotate the shaft 495 so that the electro completes its printing operation and the itemized receipt paper is fed outwardly through the slot 4210 in the casing where it may readily be detached and handed to the customer. As the sub-total device 459 moves rearwardly the resetting rack 569 is moved downwardly to clear the sub-totalizer. While this is occurring the shaft 502 will be rocked, thereby releasing the drawer and ringing the bell 599. While the sub-total device is being operated it is of course understood that the keys 10 are locked against operation by engagement of the lug 528 with the locking slot 529 of disc 527.

As the sub-total device moves to its rearward position the record strip will be given a backward movement bringing the sub-total just printed in view of the clerk. The clerk may, if he so desires, place any desirable autographic notation between the printed sub-totals, such as, his initials, the articles comprising the sale, their lot numbers, or in case of a "Paid out" transaction the reason why the amount was paid out or in the event of a "Received on account" transaction the name of the person to whom the amount is to be credited.

In the event of a special transaction not involving the receipt of money the operation is the same, except that the grand totalizer is thrown out of mesh with the actuators during the operation of the machine, but the subtotalizer will record the amounts in the usual manner, allowing a sub-total to be taken when the manipulative device 450 is operated.

Whenever the paper rolls require replenishing the clerk opens up the upper lid 285, rocks the paper frame 266 upwardly about its pivot 267 and then places the new supply roll upon the shafts 252 and 265 and threads the paper strips in the proper manner, the end of the detail strip being finally attached to the storage roll 269.

Assuming that the last transaction entered into the machine is the last one during a particular period, the proprietor then wishes to obtain the grand total of all the items entered into the grand totalizer. He adjusts the control lever to its "Reset" position thereby releasing the two lids 285 and 286. The release of the lower lid 286 permits the printer frame to be moved downwardly sufficiently to bring the platen 69 over the grand totalizer wheels.

The proprietor now inserts a separate piece of paper between the inking ribbon and platen and draws the printer frame downwardly by means of the device 276G, to take a printing impression, and then allows the printer frame to return to normal position. After the grand total has been printed the totalizer may be reset to zero by drawing the grand total clearing lever 5701 forwardly to mesh with the resetting pinion with the resetting segment. The record strip for the given period is now detached from the machine, the lids closed, and the control lever re-adjusted to its normal position, so that the machine is now in a condition to register and record the items comprising subsequent sales transacted during a succeeding period.

From the above description it will be seen that both totalizers have their wheels provided with type so that the totals standing thereon are printed upon the appropriate record material. This eliminates the necessity for the reading of totals and transferring them by hand to books, etc. which is a desirable and important feature of the present invention as it insures the correct recording of the items, sub-totals and grand totals, making an unchangeable record, valuable for future reference.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What is claimed, is:

1. In a machine of the class described, a totalizer, printing mechanism, including a movable printer frame, adapted to cause printing from the totalizer, a resetting device for the totalizer adapted to first be conditioned and then actuated, and means actuated by a movement of the printer frame to condition the resetting device for actuation.

2. In a machine of the class described, a totalizer, a movable printer frame, means to print a number standing on the totalizer upon movement of the frame, a resetting device for the totalizer normally lying in an ineffective position, and means moved through movement of the frame to move the resetting means to effective position.

3. In a machine of the class described, a totalizer, means to print a number standing on the totalizer, resetting means for the totalizer including an axially movable reset shaft, and means cooperating with the printing means to automatically move the shaft during a printing operation.

4. In a machine of the class described, a totalizer, means to print a number standing on the totalizer, a resetting means for the totalizer including an axially movable reset shaft normally lying in an ineffective position, and means cooperating with the printing means and operated during a total printing operation to move the shaft to effective position, and to thereafter actuate the resetting means.

5. In a machine of the class described, a totalizer, a movable frame carrying mechanism for printing a number standing on the totalizer, means for resetting the totalizer including an axially movable shaft normally lying in an ineffective position, and means actuated by a movement of the printer frame to move the shaft to effective position.

6. In a machine of the class described, a totalizer, means including a movable frame carrying mechanism to print a total of numbers entered on the totalizer, a resetting means for the totalizer lying normally in an ineffective position, an oscillatable lever to actuate the printing device, means including the printer frame to move the resetting means to effective position upon initial movement of the lever, and means to cause a resetting of the totalizer upon the return stroke of the lever.

7. In a machine of the class described, a totalizer, a resetting device for the totalizer including an axially movable shaft, an oscilatable lever to effect the resetting of the totalizer, and connecting means between the lever and the shaft to cause the shaft to move axially upon the forward stroke of the lever and to rotate upon the return stroke of the lever.

8. In a machine of the class described, the combination with a totalizer, a clearing shaft supporting the totalizer elements, a pawl and notch connection between the totalizer wheels and shaft, the pawls and notches normally lying out of coacting relation, a printer frame movable to record the total accumulated by the totalizer, and means actuated by the printer frame for bringing the pawls and notches into coacting relation.

9. In a cash register, the combination with a totalizer comprising a plurality of totalizer elements, a totalizer clearing shaft, resetting pawls movable with said elements, and normally out of coacting relation with notches in the clearing shaft, a printer frame movable to record the total accumulated by the totalizer, a bell-crank formed with a cam engageable with the totalizer clearing shaft and means upon the printer frame whereby the bell crank is actuated to cam the clearing shaft laterally to bring the resetting pawls and notches into coacting relation.

10. In a cash register, the combination with a totalizer comprising a plurality of totalizer elements, a totalizer clearing shaft, resetting pawls movable with said elements, and normally out of co-acting relation with notches in the totalizer clearing shaft, a printer frame movable to record the total accumulated by the totalizer, a bell-crank formed with a cam engageable with the totalizer clearing shaft, and means upon the printer frame whereby the bell-crank is actuated to cam the clearing shaft laterally to bring the resetting pawls and notches into coacting relation, means for holding the shaft in its shifted position and a resetting segment operable during the return movement of the printer frame to drive the clearing shaft to return the totalizer elements to zero.

11. In a cash register, the combination of two totalizers, a resetting segment common to both totalizers, means whereby the totalizers may be connected with the segment for actuation thereby, means for actuating the resetting segment to reset one of the totalizers, and separate means for actuating the resetting segment to reset the remaining totalizer.

12. In a cash register, the combination with two totalizers, a resetting segment common to both totalizers for clearing them at certain times, means whereby the totalizers may be connected with the segment for actuation thereby, a manipulative device under control of and accessible to the operator of the machine for clearing one of the totalizers, and a separate manipulative device inaccessible to the operator for resetting the remaining totalizer.

13. In a machine of the class described, the combination with a printing totalizer, an impression mechanism, means for operating the impression mechanism to print from the totalizer, totalizer clearing mechanism normally disconnected from the impression operating means, and devices for automatically connecting the clearing mechanism and operating means by a partial operation of said means.

FREDERICK L. FULLER.